(12) United States Patent
Song

(10) Patent No.: US 10,274,971 B2
(45) Date of Patent: Apr. 30, 2019

(54) SYSTEMS AND METHODS OF TEMPERATURE CONTROL OF DOWNSTREAM FLUIDS USING PREDICTIVE ALGORITHMS

(71) Applicant: Moen Incorporated, North Olmsted, OH (US)

(72) Inventor: Inho Song, Chesterland, OH (US)

(73) Assignee: Moen Incorporated, North Olmsted, OH (US)

(*) Notice: Subject to any disclaimer, the term of this patent is extended or adjusted under 35 U.S.C. 154(b) by 198 days.

(21) Appl. No.: 15/151,261

(22) Filed: May 10, 2016

(65) Prior Publication Data

US 2016/0334807 A1    Nov. 17, 2016

Related U.S. Application Data

(60) Provisional application No. 62/160,043, filed on May 12, 2015.

(51) Int. Cl.

| | | |
|---|---|---|
| G05D 7/00 | (2006.01) | |
| G05D 7/06 | (2006.01) | |
| G05B 13/04 | (2006.01) | |
| G06F 17/11 | (2006.01) | |
| G06F 17/16 | (2006.01) | |
| G05D 23/13 | (2006.01) | |

(52) U.S. Cl.
CPC ......... *G05D 7/0635* (2013.01); *G05B 13/048* (2013.01); *G05D 23/1393* (2013.01); *G06F 17/11* (2013.01); *G06F 17/16* (2013.01); *G05B 2219/37371* (2013.01)

(58) Field of Classification Search
CPC .. G05D 7/0635; G05D 23/1393; G06F 17/16; G06F 17/11; G05B 13/048; G05B 2219/37371
See application file for complete search history.

(56) References Cited

U.S. PATENT DOCUMENTS

| | | | |
|---|---|---|---|
| 5,944,255 A | * 8/1999 | Shirmohamadi .. | G05D 23/1393 236/12.12 |
| 2004/0000594 A1 | * 1/2004 | Beck ................... | G05D 23/1346 236/12.15 |
| 2005/0258258 A1 | 11/2005 | Jonte | |
| 2005/0288873 A1 | * 12/2005 | Urdaneta ................. | G01F 1/66 137/487.5 |
| 2007/0057215 A1 | * 3/2007 | Parsons ..................... | E03C 1/05 251/129.04 |
| 2010/0032488 A1 | * 2/2010 | Yates ................. | G05D 23/1393 236/12.1 |

(Continued)

FOREIGN PATENT DOCUMENTS

| | | |
|---|---|---|
| EP | 1376291 A2 | 1/2004 |
| WO | 2010122564 | 10/2010 |

OTHER PUBLICATIONS

International Search Report and Written Opinion for corresponding case, PCT/US2016/031655, dated Sep. 20, 2016.

*Primary Examiner* — Christopher E. Everett
(74) *Attorney, Agent, or Firm* — Calfee, Halter & Griswold, LLP

(57) ABSTRACT

Systems and methods of providing a temperature controlled stream of fluid via a shower controller or faucet controller under challenging, low-flow conditions using a predictive controller.

38 Claims, 13 Drawing Sheets

(56) References Cited

U.S. PATENT DOCUMENTS

| | | | |
|---|---|---|---|
| 2011/0224940 A1 | 9/2011 | Howe | |
| 2012/0192965 A1* | 8/2012 | Popper | E03B 7/04 |
| | | | 137/357 |
| 2013/0062422 A1* | 3/2013 | Marty | E03C 1/057 |
| | | | 236/12.16 |
| 2014/0249654 A1* | 9/2014 | Blevins | G05B 19/058 |
| | | | 700/21 |
| 2016/0334807 A1* | 11/2016 | Song | G05B 13/048 |
| 2016/0356515 A1* | 12/2016 | Carter | G05D 23/1917 |
| 2017/0268208 A1* | 9/2017 | LaMarche | E03C 1/057 |
| 2017/0298596 A1* | 10/2017 | Adelman | E03B 7/045 |

* cited by examiner

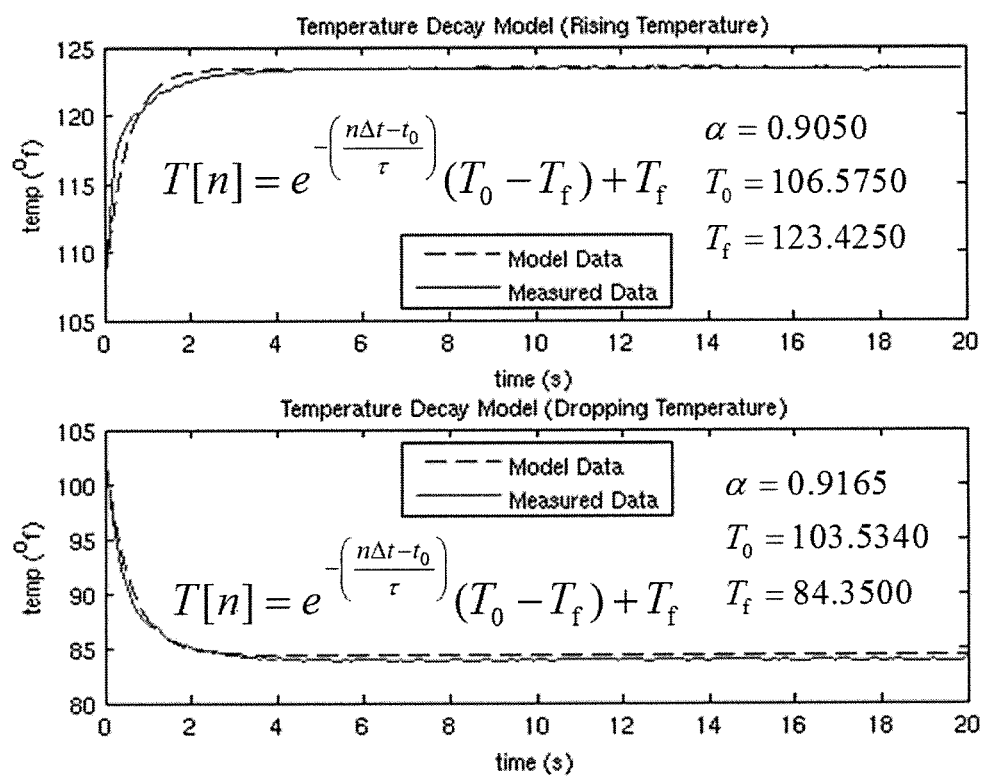
Figs. 11A (top) and 11B (bottom)

Key for Figs. 13A-E and 14A-C
- Measured Data
- – – Estimated Future
- ○ Current Time

SYSTEMS AND METHODS OF TEMPERATURE CONTROL OF DOWNSTREAM FLUIDS USING PREDICTIVE ALGORITHMS

CROSS-REFERENCE TO RELATED APPLICATIONS

This application claims priority to, and any other benefit of, U.S. Provisional Application No. 62/160,043, filed May 12, 2015, the entire disclosure of which is hereby incorporated by reference.

BACKGROUND

The present application generally relates to the field of temperature control of a downstream flow of fluid and, more specifically, to systems and methods of providing a temperature controlled stream of fluid via a shower controller or faucet controller.

Traditional shower valves are well known and are used to turn on and set a temperature of a fluid flowing into a shower by manually adjusting a ratio of hot water and cold water flowing downstream of the valve. Traditional manual shower and faucet valves do not maintain temperature to a significant change in flow rate of incoming hot water (e.g., when a dishwasher or washing machine turns on) or a significant change in flow rate of incoming cold water (e.g., when a local toilet is flushed). Accordingly, such significant changes in incoming hot or cold water can cause significant discomfort to a showerer (one taking a shower), and perhaps scald the showerer.

Accordingly, automatic shower control valves that attempt to adjust to changes in supply pressure are known. The American Society of Sanitary Engineering (ASSE) has promulgated a standard, ASSE 1016, for temperature performance of automatic shower valves. The ASSE 1016 standard applies to three types of individual shower control valves: pressure balancing (e.g., mechanical), thermostatic, and combination thermostatic and pressure balancing. For example, pressure balancing shower control valves under ASSE 1016 must not exceed ±3.6° F. (±2° C.) temperature control under the following conditions: hot and/or cold water supply pressures increased or decreased by 50%.

SUMMARY

The present application discloses systems and methods of providing a temperature controlled stream of fluid via a shower controller or faucet controller under challenging, low-flow conditions. An exemplary system and method uses only a single sensor—a temperature sensor downstream of a mixer—and does not use other sensors, such as hot and cold supply flow rate sensors or hot and cold supply temperature sensors. In other systems and methods, however, additional sensors, such as flow and temperature sensors may be used.

One exemplary embodiment of the present disclosure relates to a fluid control system. The fluid control system includes at least one electronically controlled valve; and at least one processor programmed to control the electronically controlled valve to control a temperature of a fluid downstream of the valve using a predictive algorithm.

Another exemplary embodiment of the present disclosure relates to a fluid control system. The fluid control system includes at least one electronically controlled valve; a temperature sensor associated with the valve; and at least one processor programmed to control the valve to control a temperature of a fluid downstream of the valve using at least a predictive algorithm including at least data from the temperature sensor and a model of a temperature response of at least a portion of the system. In an exemplary system, the model of a temperature response of at least a portion of the system comprises a mathematical or non-mathematical relation modeling the connection between step changes in the hot/cold mix condition and subsequent changes in the signal response of the temperature sensor.

Still another exemplary embodiment of the present disclosure relates to a fluid control system. The fluid control system includes at least one processor having associated memory; at least one valve having at least a hot fluid input, a cold fluid input, a hot fluid output, and a cold fluid output, the at least one valve controlling (a) a flow of hot fluid between the hot fluid input and output and (b) a flow of cold fluid between the cold fluid input and output in response to one or more signals from the processor (directly or indirectly); a mixing chamber downstream of the at least one valve for mixing the flows of hot and cold fluids output by the at least one valve; a temperature sensor downstream of the at least one valve and generating a real time temperature signal indicating a temperature of a fluid downstream of the mixing chamber; and a user input device that receives user input and communicates to the at least one processor user data corresponding to the user input, the user data including at least a desired temperature input; and the memory having stored thereon at least a model of a temperature response of the temperature sensor; the memory having further stored thereon code causing the at least one processor to receive an entered desired temperature input via the user input device; receive measured temperature data corresponding to the real time temperature signal; and control the valve to control a temperature of the fluid downstream of the mixing chamber toward the desired temperature input using a predictive algorithm using at least (i) the model of the temperature response of the temperature sensor and (ii) the measured temperature data. In an exemplary system, the model of a temperature response of at least a portion of the system comprises a mathematical or non-mathematical relation modeling the connection between step changes in the hot/cold mix condition and subsequent changes in the signal response of the temperature sensor.

Yet another exemplary embodiment of the present disclosure relates to a computer-implemented method of controlling temperature of a fluid. The computer-implemented method includes: providing an electronically controlled valve; receiving measured temperature data associated with the valve; and controlling the valve to control a temperature of a fluid downstream of the valve using a processor programmed with a predictive algorithm using at least a model of a temperature response of a temperature sensor providing the measured temperature data. In an exemplary system, the model of a temperature response of at least a portion of the system comprises a mathematical or non-mathematical relation modeling the connection between step changes in the hot/cold mix condition and subsequent changes in the signal response of the temperature sensor.

BRIEF DESCRIPTION OF DRAWINGS

FIGS. 11A-C are data plots showing exemplary measured temperature and modeled temperature in the electronic fluid control system of FIG. 7.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless a limiting definition is expressly provided herein.

Figure 1:
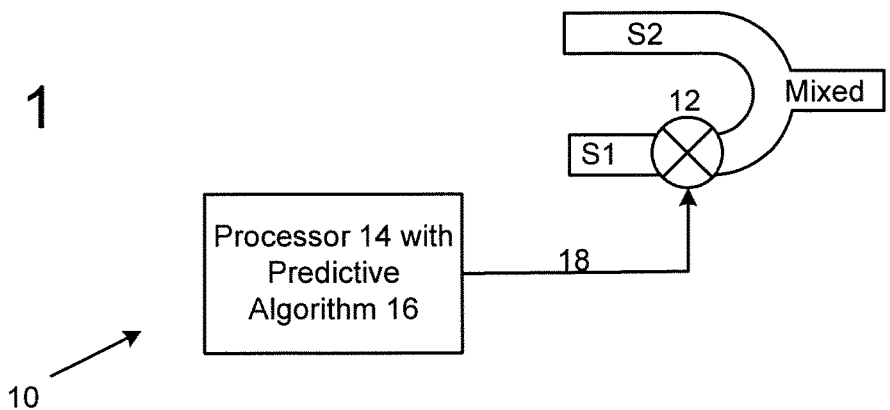
FIG. 1 is a schematic block diagram of an exemplary electronic fluid control system.

Referring now to FIG. 1, a block diagram of an exemplary fluid control system 10 is shown. Exemplary fluid control system 10 comprises at least one electronically controlled valve 12 and at least one processor 14 programmed with code causing the processor to automatically control the electronically controlled valve 12 to control a temperature of a fluid downstream of the valve using a predictive algorithm 16. "Processor" or "computer" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), complex programmable logic devices (CPLDs), etc. Exemplary fluid control system 10 has logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. In exemplary embodiments, some or all of the software is stored on memory 14, which includes one or more non-transitory computer readable media of one or more local or remote data storage devices (for remote memories, system 10 will include a communications circuit, not shown). As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., RAM, ROM, PROM, EPROM, EEPROM, flash PROM, external flash memory drives, etc.

In the example of FIG. 1, there are two fluid supply lines S1 and S2 at different temperatures and processor 14 controls at least one valve 12 via at least one respective control line 18 to control the temperature of the mixed fluid downstream of the valve 12. In exemplary systems 10, the predictive algorithm 16 is predictive in the sense that it calculates a future state of the system 10. In exemplary system 10, the predictive algorithm 16 comprises an algorithm that calculates a future state of the system 10 using at least (i) a model of the temperature response of at least a portion of the system, e.g., a mathematical or non-mathematical relation modeling the connection between step changes in the hot/cold mix condition and subsequent changes in the signal response of the temperature sensor, and (ii) the measured temperature data. As used herein, a "step change" means a change in level detectable as a rapid change by a showerer, e.g., someone flushing a local toilet causes a step change in cold water supply pressure or someone turning on a washing machine or dishwasher using hot water causes a step change in hot water supply pressure (although these changes in supply pressure might not be seen as a step change when looked at over a nanosecond or microsecond standpoint, to a person standing in a shower, the change is dramatic and feels like a step change). Suitable algorithms for implementing predictive algorithm 16 are those in the category of algorithms known as Kalman filters (such as ordinary Kalman filters, extended Kalman filters, unscented Kalman filters, and other Kalman filters) programmed to calculate a future state of the system 10 using at least (i) the model of the temperature response of at least a portion of the system, e.g., a mathematical or non-mathematical relation modeling the connection between step changes in the hot/cold mix condition and subsequent changes in the signal response of the temperature sensor, and (ii) the measured temperature data. Although not tested, other predictive algorithms might also give suitable results. As the term "predictive" is used herein, proportional-integral-derivative controllers ("PID controllers") are not predictive. As known to those skilled in the art, PID controllers generate a control signal that is the sum of three terms: a proportional term that is proportional to an error signal (difference between measured and setpoint values), an integral term that is proportional to the integral of the error signal, and a derivative term that is proportional to the derivative of the error signal. None of these calculates or involves the calculation of a future state of the system being PID-controlled, nor does the combined PID control algorithm calculate a future state of the system being PID-controlled. The derivative term of a PID controller calculates an error term using a tangent to the error curve; however, that is fundamentally different from the predictive algorithms 16 used herein, which calculate a future state of the system 10. Some exemplary predictive algorithms 16 herein calculate the future state of the system 10 by calculating (predicting) based on the few most recent data points where the system state will result. Control logic then determines whether it is acceptable for the system to end up in that state and, if not, applies an appropriate control signal.

Figure 5:
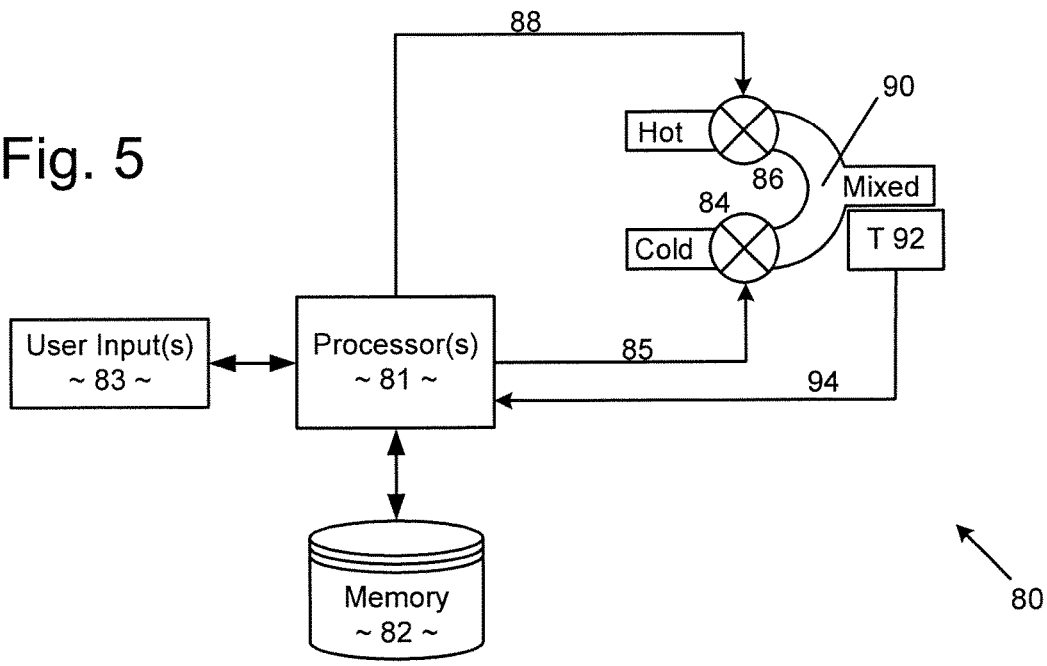
FIG. 5 is a schematic block diagram of yet another exemplary electronic fluid control system.
Figure 9:
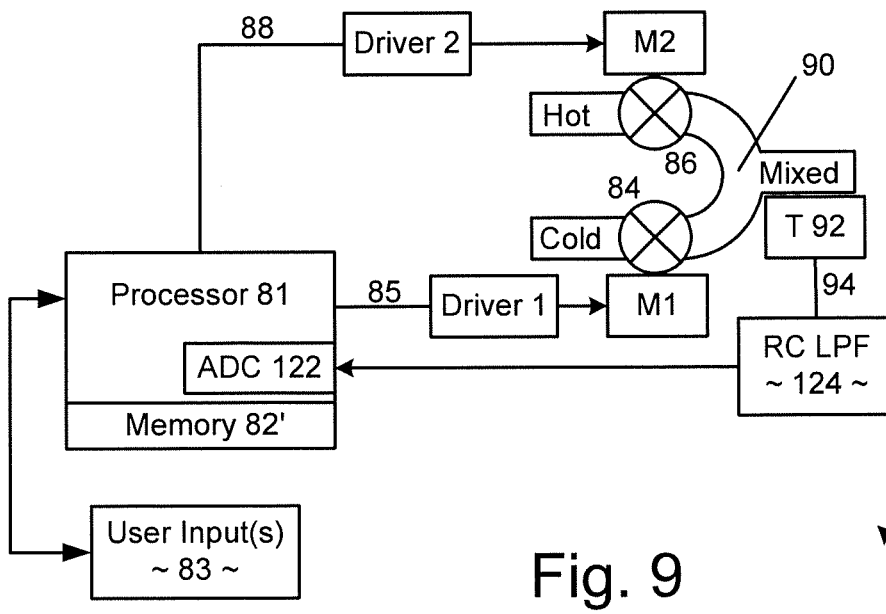
FIG. 9 is a schematic block diagram showing various electronic and electromechanical hardware for the electronic fluid control system of FIG. 7.

As mentioned above, the predictive algorithm 16 calculates a future state of the system 10 using at least a model of the temperature response of at least a portion of the system, e.g., a mathematical or non-mathematical relation modeling the connection between step changes in the hot/cold mix condition and subsequent changes in the signal response of the temperature sensor. Some exemplary embodiments use an exponential function that models the predicted temperature response of at least a portion of the system, that is, predicts a future final temperature of the system based on measured data (e.g., FIGS. 11A-11B) with parameters that map the exponential model onto measured temperature response of at least a portion of the system, such as the temperature response of a temperature sensor, e.g., temperature sensor 44 (FIG. 3) or 92 (FIGS. 5, 9). Other models might provide sufficient accuracy and speed to providing a temperature controlled stream of fluid via a shower controller or faucet controller under challenging, low-flow conditions as discussed herein, and thus the model of the temperature response of at least a portion of the system might comprise in the alternative or in addition, e.g.:

(a) the first N terms (e.g., n=6 or 7 or 8 or more) in a power series (including without limitation an exponential power series, a Taylor series, a geometric series, or some other power series) or some other equation that (i) approximates such an exponential function with such parameters, (ii) approximates measured temperature response data of at least a portion of the system, and/or (iii) approximates any of the other models herein;

(b) a lookup table that (i) approximates such an exponential function with such parameters, (ii) approximates measured temperature response data of at least a portion of the system, and/or (iii) approximates any of the other models herein;

(c) a series of equations and/or lookup tables that model (i) the thermal mass of the system 10 or at least a portion of the system 10, and/or (ii) the thermal conductivity of the system 10 or at least a portion of the system 10, and/or (iii) the distance between the mixer and the temperature sensor and/or the volume of water in the waterway between the mixer and the temperature sensor, and/or (iv) the normal temperature response of the temperature sensor (outside the system 10).

(d) a piece-wise linear approximation (i) of such an exponential function with such parameters, (ii) of measured temperature response data of at least a portion of the system, and/or (iii) of any of the other models herein;

(e) an equation or lookup table (an exponential function or (a)-(c) above) that merely provides a predicted future final temperature of the system or at least a portion of the system, such as the temperature response of a temperature sensor, e.g., temperature sensor 44 (FIG. 3) or 92 (FIGS. 5, 9) based on the few or several most recent measured data points (this is in contrast with an equation such as an exponential function or (a)-(c) above configured to model the entire progression of the change, such as in FIGS. 11A-11B);

(f) some other equation or model that (i) approximates such an exponential function with such parameters, (ii) approximates measured temperature response data of at least a portion of the system, and/or (iii) approximates any of the other models herein; and/or (g) some other equation or model.

The non-lookup table models can be implemented with or without one or more supplemental lookup tables and with or without supplemental equations. Thus, in some exemplary embodiments, the models include a mathematical relation modeling the connection between step changes in the hot/cold mix condition and subsequent changes in the signal response of the temperature sensor (e.g., the equations) and other exemplary embodiments include a non-mathematical relation modeling the connection between step changes in the hot/cold mix condition and subsequent changes in the signal response of the temperature sensor (e.g., the lookup tables). In some exemplary embodiments, the model of the temperature response of at least a portion of the system will model a response to a step change. In addition or in the alternative, some exemplary models of the temperature response of at least a portion of the system will, instead of having the temperature changing virtually instantaneously as perceived by the showerer (step change), model a change in temperature linearly, exponentially, or in other manners and use a model of that response instead.

Figure 2:
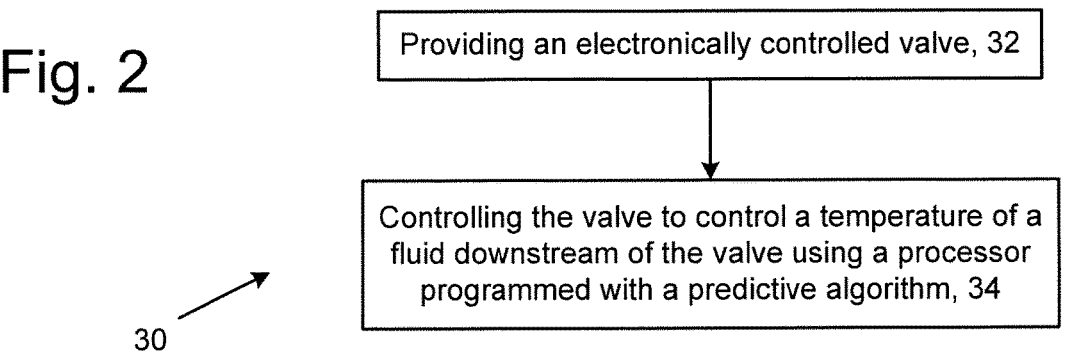
FIG. 2 is a schematic flow chart showing an exemplary electronic fluid control method.

Referring now to FIG. 2, a flow chart of an exemplary fluid control method 30 is shown. The exemplary method 30 comprises providing an electronically controlled valve, at 32, and controlling the valve to control a temperature of a fluid downstream of the valve using a processor programmed with a predictive algorithm, at 34. The exemplary system 10 described in connection with FIG. 1 can be used to implement the method 30 of FIG. 2.

Figure 3:
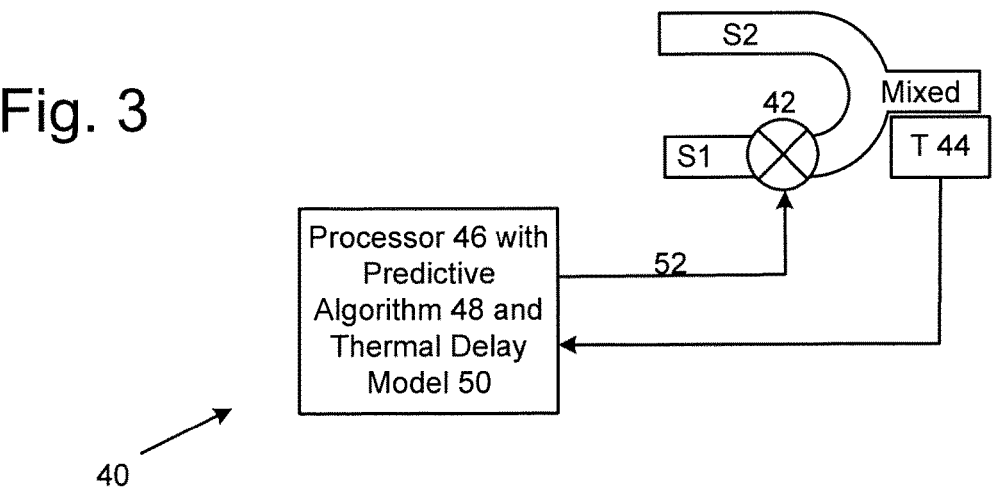
FIG. 3 is a schematic block diagram of another exemplary electronic fluid control system.

Referring now to FIG. 3, a block diagram of another exemplary fluid control system 40 is shown. Exemplary fluid control system 40 comprises at least one electronically controlled valve 42, a temperature sensor 44 associated with the valve 42, and at least one processor 46 programmed with code causing the processor to automatically control the electronically controlled valve 42 to control a temperature of a fluid downstream of the valve using at least a predictive algorithm 48 including at least data from the temperature sensor 44 and a model of a temperature response of at least a portion of the system 40. Exemplary fluid control system 40 has logic for performing the various functions and processes described herein.

In the example of FIG. 3, there are two fluid supply lines S1 and S2 at different temperatures and processor 46 controls at least one valve 42 via at least one respective control line 52 to control the temperature of the mixed fluid downstream of the valve 42. In exemplary systems 40, the predictive algorithm 48 is predictive in the sense that it calculates a future state of the system 40. Like the predictive algorithm 16 discussed above, the predictive algorithm 48 comprises an algorithm that calculates a future state of the system 10 using at least (i) the model of the temperature response of at least a portion of the system, e.g., a mathematical relation modeling the connection between step changes in the hot/cold mix condition and subsequent changes in the signal response of the temperature sensor, and (ii) the measured temperature data. As also discussed above, suitable algorithms are those in the category of algorithms known as Kalman filters, which are fundamentally different from other controllers, such as PID controllers. The processor 46 is then programmed to control the valve 42 using current state calculations based on the calculated future state of the system 40. In exemplary systems 40, the predictive algorithm 48 includes or is otherwise based on a Kalman filter programmed to calculate a future state of the system 40. This Kalman filter programmed to calculate a future state of the system 40 is in addition to any Kalman filter used for upstream signal conditioning, such as signal conditioning of upstream data from the temperature sensor 44.

In exemplary systems 40, the model of the temperature response of at least a portion of the system comprises a model of the temperature response of at least a portion of the system. In exemplary systems 40, the model of the temperature response comprises a function indicating the response of the temperature sensor to a step change (e.g., a step increase and/or a step decrease) in temperature surrounding the temperature sensor. As discussed above in more detail, the model of the temperature response of at least a portion of the system can comprise any one or any two or more of the following: an exponential function, another exponential model, the first N terms in a power series (including without limitation an exponential power series, a Taylor series, a geometric series, or some other power series), a lookup table, a piece-wise linear approximation, an equation or lookup table that merely provides a predicted future final temperature of the system based on the few or several most recent measured data points; and/or some other equation or model that predicts a future temperature.

Figure 4:
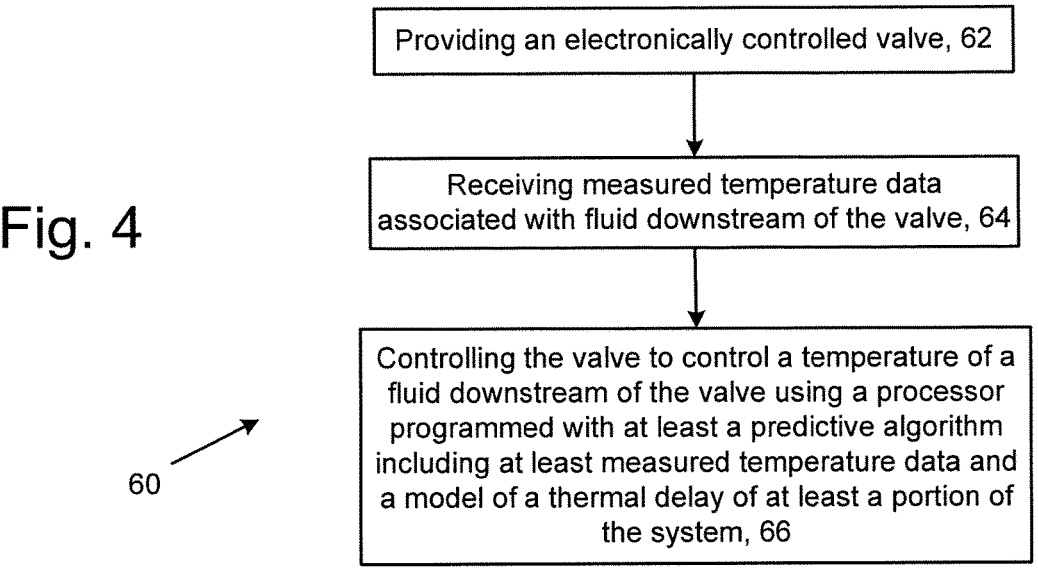
FIG. 4 is a schematic flow chart showing another exemplary electronic fluid control method.

Referring now to FIG. 4, a flow chart of another exemplary fluid control method 60 is shown. The exemplary method 60 comprises providing an electronically controlled valve, at 62, receiving measured temperature data associated with fluid downstream of the valve, 64, and controlling the valve to control a temperature of a fluid downstream of the valve using a processor programmed with at least a predictive algorithm including at least measured temperature data and a model of a temperature response of at least a portion of the system, 66. The exemplary systems 40 described in connection with FIG. 3 can be used to implement the method 60 of FIG. 4.

Referring now to FIG. 5, a block diagram of another exemplary fluid control system 80 is shown. Exemplary fluid control system 80 comprises one or more processors 81 having associated memory 82. Exemplary fluid control system 80 has logic for performing the various functions and processes described herein, e.g., automatically controlling the valves to control the temperature of the fluid. Exemplary fluid control system 80 further comprises a user input device 83 that receives user input and communicates to the at least one processor 81 user data corresponding to the user input, the user data including at least a desired temperature of fluid to be dispensed by the system 80. In some exemplary embodiments, arrow buttons allow a showerer to select a desired temperature and perhaps a desired flow for the shower; actuation of another button causes the system to open the valves and begin controlling the temperature of the shower flow to the desired temperature. In other exemplary embodiments, a number of preset buttons allow a showerer to pre-configure a desired temperature and perhaps a desired flow for the shower and easily press that one button to immediately cause the system to open the valves and begin controlling the temperature of the shower flow.

Figure 10A:
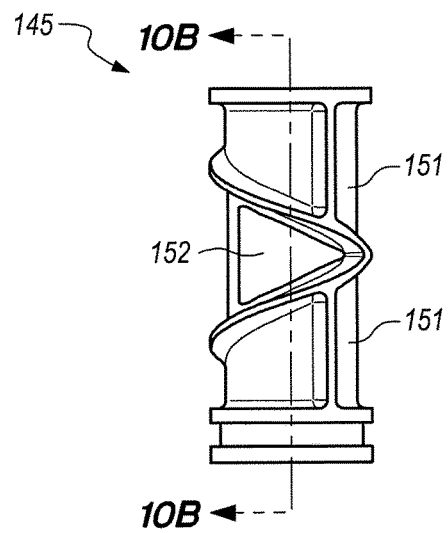
FIG. 10A is a front elevational view of an exemplary two-stream mixer suitable for use with the electronic fluid control system of FIG. 7.
Figure 10B:
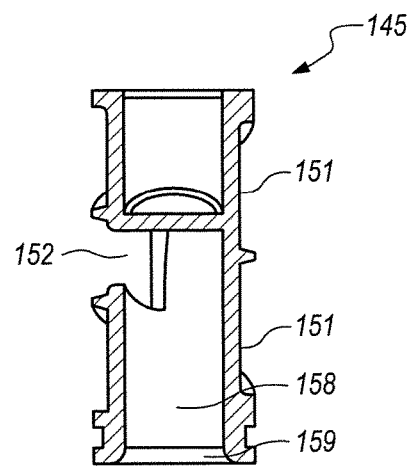
FIG. 10B is a sectional view of the exemplary mixer of FIG. 10A taken along section line B-B.
Figure 10C:
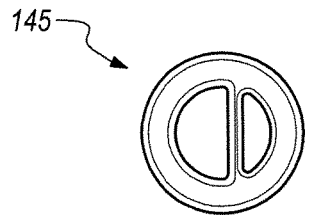
FIG. 10C is a top plan view of the exemplary mixer of FIG. 10A.
Figure 10D:
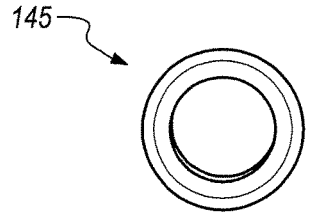
FIG. 10D is a bottom plan view thereof.
Figure 10E:
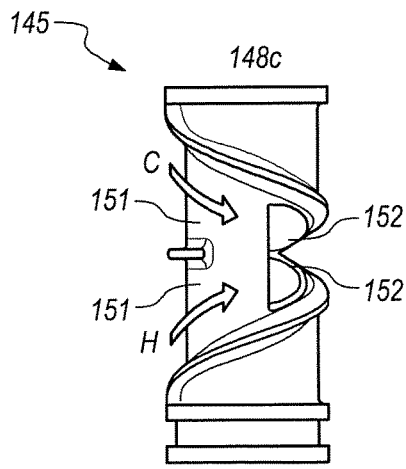
FIG. 10E is a left side elevational view thereof.
Figure 10F:
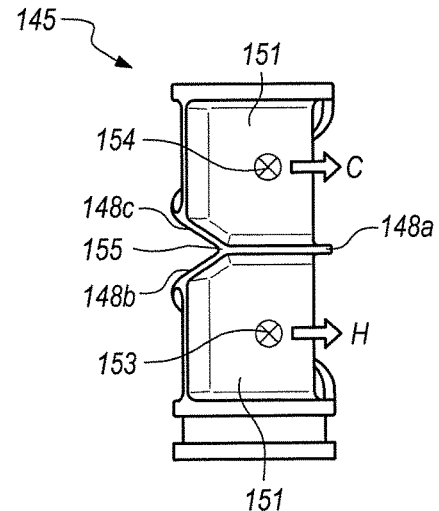
FIG. 10F is a right side elevational view thereof.
Figure 10G:
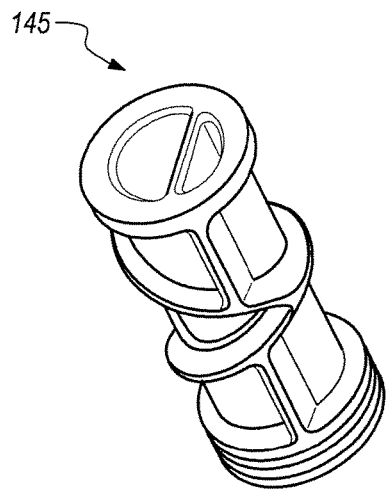
FIG. 10G is a front/right/top perspective view thereof.
Figure 10H:
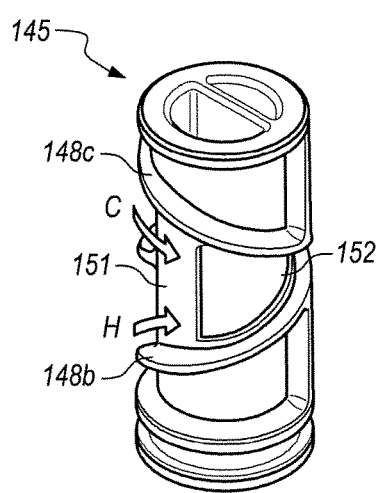
FIG. 10H is a front/left/top perspective view thereof.
Figure 10J:
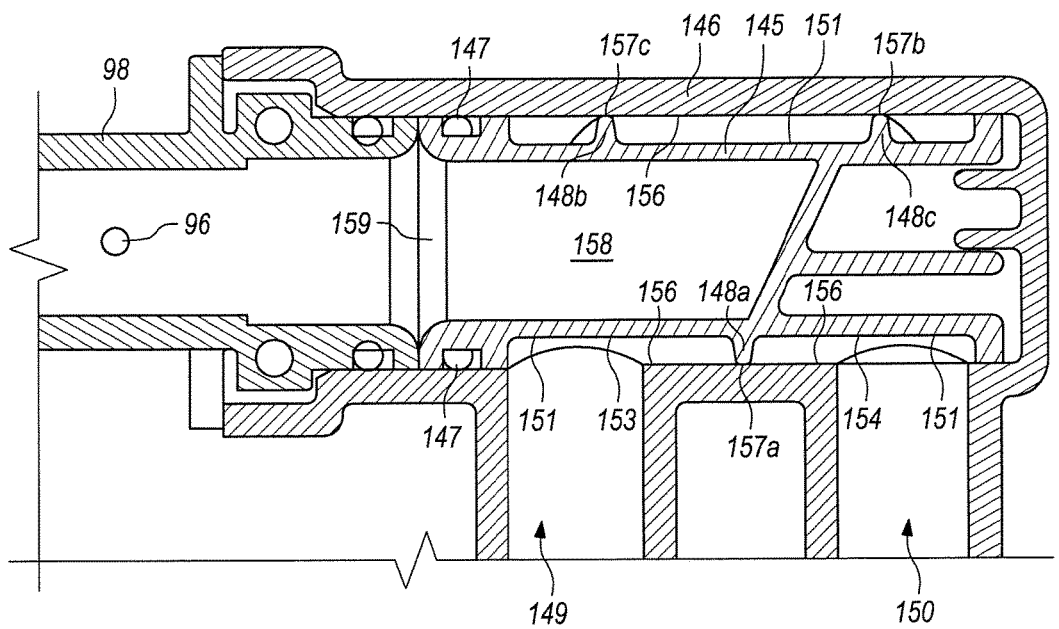
FIG. 10J is a front sectional view showing the exemplary mixer of FIG. 10A inside a conduit.

Exemplary fluid control system 80 comprises at least one electronically controlled cold valve 84 having a cold fluid input and a cold fluid output, the at least one cold valve 84 controlling a flow of cold fluid between the cold fluid input and output in response to at least one cold control signal 85 from the processor 81. Exemplary fluid control system 80 further comprises at least one electronically controlled hot valve 86 having a hot fluid input and a hot fluid output, the at least one hot valve 86 controlling a flow of hot fluid between the hot fluid input and output in response to at least one hot control signal 88 from the processor 81. Exemplary fluid control system 80 further comprises a mixing chamber 90 downstream of the valves 84, 86 for mixing the flows of hot and cold fluids output by the valves 84, 86. Exemplary fluid control system 80 also comprises a temperature sensor 92 downstream of the mixing chamber 90 and generating a real time temperature signal 94 indicating a measured temperature of a fluid downstream of the mixing chamber 90. Temperature sensor 92 can be secured in a bore, molded opening, or other opening 96 in a conduit 98 downstream of the mixer 90, 145 (FIG. 10J). "Real-time" and "real time" as used herein means using, storing, or transmitting data or signals for use or storage at substantially the same time it is being generated or promptly after it is generated. Real-time data is generally transmitted soon enough and often enough to influence a process accepting the real-time data as an input used by the process.

Figure 6:
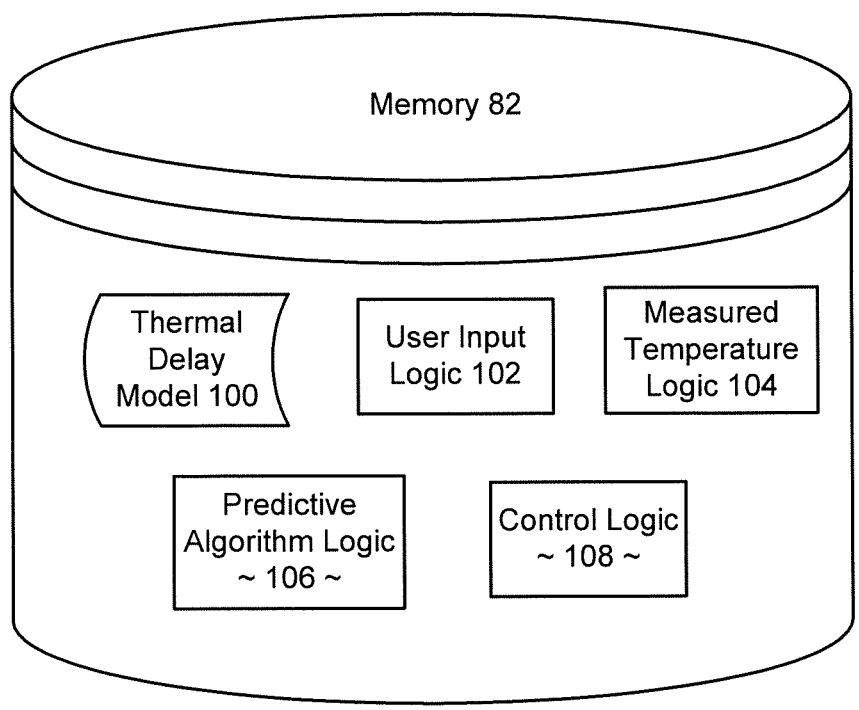
FIG. 6 is a schematic diagram of an exemplary non-transitory computer readable media of the electronic fluid control system of FIG. 5.

As shown in FIG. 6, memory 82 has stored thereon at least: a model 100 of a temperature response of at least a portion of the system, user input logic 102 causing the processor 81 to receive an entered desired temperature input via the user input device 83, measured temperature logic 104 causing the processor to receive measured temperature data corresponding to the real time temperature signal 94, and predictive algorithm logic 106 and control logic 108 working together to cause the processor to control the valves 84, 86 to control the temperature of the fluid downstream of the mixing chamber 90 toward the desired temperature input using the predictive algorithm 106 acting on at least (i) the model 100 of a temperature response of at least a portion of the system and (ii) the measured temperature data. The control logic 108 generates signals to control the valves 84, 86 with input from the predictive algorithm logic 106.

In the example of FIG. 5, there are two fluid supply lines Cold, Hot at different temperatures and processor 81 controls the valves 84, 86 via respective control lines 85, 88 to control the temperature of the mixed fluid downstream of the valves 84, 86 using predictive algorithm logic 106. In exemplary systems 80, the predictive algorithm logic 106 is predictive in the sense that it calculates a future state of the system 80. Like the predictive algorithm 16 discussed above, the predictive algorithm 80 comprises an algorithm that calculates a future state of the system 10 using at least (i) the model of the temperature response of at least a portion of the system, e.g., a mathematical relation modeling the connection between step changes in the hot/cold mix condition and subsequent changes in the signal response of the temperature sensor, and (ii) the measured temperature data. As discussed above, suitable algorithms are those in the category of algorithms known as Kalman filters, which are fundamentally different from other controllers, such as PID controllers. The processor 81 is programmed to control the valves 84, 86 using the calculated future state of the system 80. In exemplary systems 80, the predictive algorithm logic 106 includes or is otherwise based on a Kalman filter programmed to calculate a future state of the system 80. This Kalman filter programmed to calculate a future state of the system 80 is in addition to any Kalman filter used for upstream signal conditioning, such as signal conditioning of upstream data from the temperature sensor 92.

In exemplary systems 80, the model of the temperature response of at least a portion of the system comprises a model of the temperature response of the temperature sensor 92. In exemplary systems 80, the model of the temperature response of the temperature sensor comprises a mathematical relation modeling the connection between step changes (e.g., a step increase and/or a step decrease) in the hot/cold mix condition and subsequent changes in the signal response of the temperature sensor. As discussed above in more detail, the model of the temperature response of at least a portion of the system can comprise any one or any two or more of the following: an exponential function, another exponential model, the first N terms in a power series (including without limitation an exponential power series, a Taylor series, a geometric series, or some other power series), a lookup table, a piece-wise linear approximation, an equation or lookup table that merely provides a predicted future final temperature of the system based on the few or several most recent measured data points; and/or some other equation or model that predicts a future temperature.

In exemplary systems 10, 40, 80 having two valves, it might be advantageous to simplify the control logic 108 and thus achieve acceptable control with a less powerful processor by controlling the valves in a so-called "see-saw" manner so that the resulting flow is substantially constant, e.g., as one valve is closed an amount X, the other valve is opened by the same amount X, and vice versa. For example, in the exemplary embodiment 80 of FIG. 5, it might be advantageous to simplify the control logic by controlling the valves in a see-saw manner so that the resulting flow is substantially constant proximate the control point, e.g., as the Hot valve 86 is closed an amount X (e.g., closed by five stepper motor steps), the Cold valve 84 is opened by the same amount X (e.g., opened by the same five stepper motor steps), and vice versa. The following example is in the context of FIG. 5. Initially, both valves 84, 86 are closed. In response to a showerer indicating using user inputs 83 that the system 80 is to begin dispensing fluid at a desired temperature ($T_{des}$) and a desired flow ($F_{des}$), the processor 81 opens both valves 84, 86 and the system controls each valve 84, 86 independently to achieve $T_{des}$ at $F_{des}$. After that, the control algorithm switches to a see-saw algorithmic mode, where as the Hot valve 86 is closed an amount, the Cold valve 84 is opened by the same amount, and vice versa.

Figure 7:
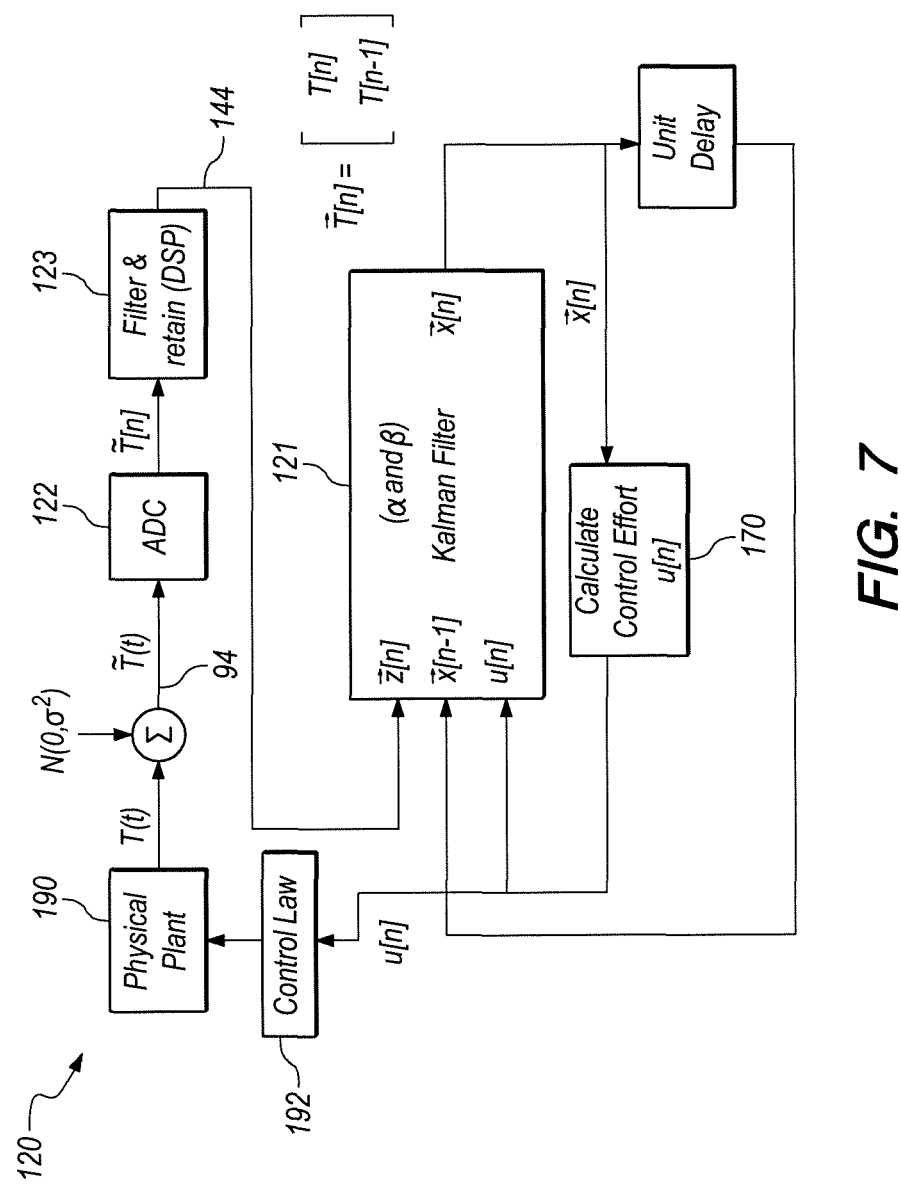
FIG. 7 is a schematic data flow diagram of an exemplary implementation of an electronic fluid control system.

Referring now to FIGS. 7-12, these figures show various aspects of an exemplary implementation 120 of the system 80 of FIG. 5 that uses a Kalman filter 121 as a predictive algorithm. FIG. 7 is an exemplary data flow diagram for the exemplary implementation 120. Temperature sensor 92 (FIG. 9) can be a thermistor or other temperature sensor. The system 120 has an output temperature T(t) that is partially dependent on the control effort u[n], as explained below. Temperature measurement signal 94 from temperature sensor 92 (FIG. 9) comprises the actual temperature of the system T(t) that has been contaminated by noise $N(0,\sigma^2)$. The noisy temperature signal 94 is sampled via analog-to-digital converter (ADC) 122 and the result is filtered with various digital filters 123 explained below. Although a Kalman filter can be used to digitally filter noise $N(0,\sigma^2)$ from an actual temperature signal T(t), the Kalman filter 121 predictive algorithm in exemplary implementation 120 is different than any such noise filtering Kalman filters, as further explained below.

Figure 8:
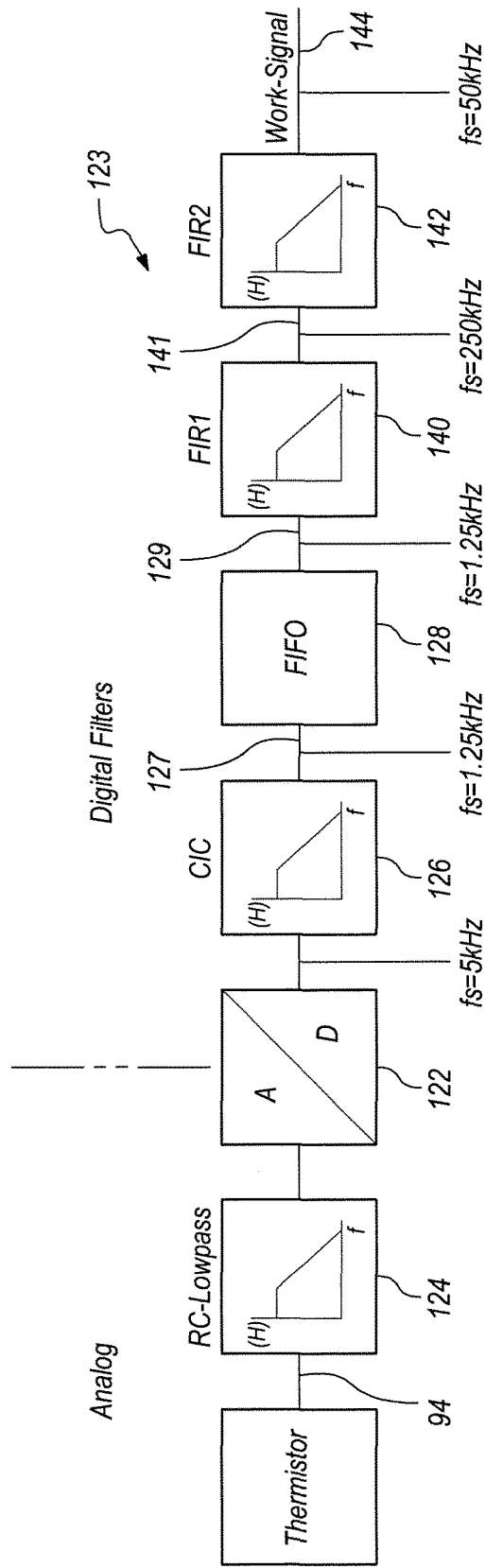
FIG. 8 is a schematic block diagram of an exemplary filter configuration for the electronic fluid control system of FIG. 7.

FIG. 8 shows exemplary filters that can be used in the exemplary implementation 120. The noisy temperature signal 94 is first passed through an analog, hardware RC low-pass filter 124, e.g., a 0.1 µF capacitor with a 33 k ohm resistor in the standard RC low-pass filter configuration, and then digitized with ADC 122, which can be either a separate ADC or an ADC integrated in the processor 81. A suitable ADC sample rate for digitization of the noisy temperature signal 94 is 5 kHz. As shown in FIG. 8, the digitized temperature signal is then filtered in the digital domain using a cascaded integrator-comb (CIC) filter 126, such as a CIC filter with the following characteristics: R (decimation or interpolation ratio)=4, M (number of samples per stage)=2, and N (number of stages in filter)=4, or some other moving average filter. The resulting signal 127 has a sample rate of 1.25 kHz, which is fed into a 100-stage first-in-first-out (FIFO) delay 128. The delayed signal 129 is then filtered with two finite impulse response (FIR) filters 140, 142. The first FIR filter 140 has 44 coefficients for the 44 input values and results in a signal 141 that has signals about 125 Hz filtered out with more than 73 dB, with a sample rate of 250 Hz. The second FIR filter 142 has all frequencies above 25 Hz filtered out by more than 73 dB and results in a work signal 144 with a sample rate of 50 Hz, which is the refresh rate of the Kalman filter 121. Referring back to FIG. 7, the last three filtered temperature values are retained as observed samples for use in the Kalman filter 121. For example, to retain three samples at any given time, the oldest sample is purged out as a new data sample comes in. Although exemplary filters, circuits and sampling rates have been provided, those of skill in the art will appreciate that filters, circuits and sampling rates having other values are also within the scope of the various embodiments of the invention.

Referring now to FIG. 9, this figure shows an exemplary hardware configuration for exemplary implementation 120. Processor 81 can be a TI brand MSP430 microcontroller with integrated ADC 122 and integrated non-transitory computer readable memory 82'. Exemplary fluid control system 120 has logic for automatically performing the various functions and processes described herein, e.g., the logic shown in FIG. 12 as stored on memory 82'. Any number of other processors might be suitable to provide the functionality described herein, e.g., an ATmega® 328 microcontroller or an ARM® Cortex®-M0+ processor. User input(s) 83 can be any number of user interfaces capable of accepting input from a user and communicating those inputs to processor 81, such as desired shower temperature and/or desired shower flow, e.g., momentary pushbuttons or a computer touch screen display displaying one or more icons and having associated regions of the touch screen configured to accept user presses, such as temperature select up, temperature select down, shower on/off, User1, User2, etc. Cold valve 84 and hot valve 86 can be the needle valves (proportional valves) used in the commercially available MOEN brand kitchen faucet model "Sto," model number S72308EC." Cold control line 85 is driven by Driver 1 to generate controls for cold motor M1 that drives a needle or other valve member (not shown) of cold valve 84. Hot control line 88 is driven by Driver 2 to generate controls for hot motor M2 that drives a needle or other valve member (not shown) of hot valve 86. The motors M1, M2 can be, for example, NMB brand model number PL25L stepper motors. Although not tested, A.u.K. Mueller brand servo-direct stepper motor controlled valves, Series 10.010.126-sds, are believed to be usable with the exemplary hardware configuration of FIG. 9. The drivers Driver 1 and Driver 2 can be, for example, STMicroelectronics brand model number L9942 stepper motor driver circuits. If such stepper motor driver circuits are used, processor 81 may simply write to Driver 1 and Driver 2 the desired position of motors M1, M2, respectively, and Driver 1 and Driver 2 cause the motors M1, M2 to move to those positions. Temperature sensor 92 can be a thermistor, for example, US Sensor brand model number USP14840 thermistor. In exemplary implementation 120, there are no encoders or other sensors providing sensed position of the valves 84, 86, which simplifies the circuit and reduces cost. Such sensors can be added, but are unnecessary in the exemplary embodiment. In the alternative, encoders or other sensors (not shown) generating signals indicating the sensed positions of the valves 84, 86 can be provided and included in the system 120. Further, although only one sensor is used in the exemplary systems shown, those of skill in the art understand that additional sensors, such as flow and temperature sensors may be used to measure the hot and cold temperature prior to being mixed and water flow at various points in the system.

FIGS. 10A-10H show various views of an exemplary mixer 145 that can be used as mixer 90 in exemplary implementation 120. Mixer 145 rapidly mixes two fluids, which can be helpful for the present application because the faster the controlled hot and cold streams are mixed, the sooner the temperature sensor 92 can detect the measured temperature signal and the sooner the processor 81 can add a valid temperature measurement into the Kalman filter 121. FIG. 10J shows mixer 145 in conduit 146 and sealed with gasket (O-ring) 147. Exemplary mixer 145 has directing walls 148 that cause fluid from hot and cold inlets 149, 150 to flow around outside wall 151 of mixer 145 (i.e., between the outside wall 151 and the inside wall of conduit 146) and into opening 152 of mixer 145. Hot fluid from hot inlet 149 initially engages the mixer 145 at 153 and cold fluid from cold inlet 150 initially engages the mixer 145 at 154. Exemplary mixer 145 has a circumferential outer directing wall 148a that initially keeps the hot and cold flows separate as they begin to swirl around outside wall 151 of mixer 145 (i.e., between the outside wall 151 and the inside wall of conduit 146). Helical outer directing walls 148b, 148c cause the hot and cold flows to swirl around outside wall 151 of mixer 145 toward each other to converge and mix to form mixed water (presumably warm water) which enters opening 152 of mixer 145. Helical outer directing walls 148b, 148c meet at a point 155 on the other side of opening 152. As shown in FIG. 10J, circumferential outer directing wall 148a contacts the inside wall 156 of conduit 146 at a point 157a, helical outer directing wall 148b contacts the inside wall 156 of conduit 146 at a point 157c, and helical outer directing wall 148c contacts the inside wall 156 of conduit 146 at a point 157b. From the perspective of FIG. 10J, the hot and cold fluids flow through their respective inlets 149, 150 up to wall 151, rearward and up around the back of mixer 145, up and over the apex of wall 151 of mixer 145 in that figure where they begin mixing, and forward and down and toward opening 152. Mixed fluid enters opening 152 of mixer 145, enters inside cavity 158 of mixer 145, and exits mixed water outlet 159. Mixer 145 causes the hot and cold fluid streams to swirl in non-parallel directions which causes the streams to rapidly mix (upstream of the temperature sensor). Mixer 145 can be molded from a number of suitable polymers, such as polyphenylsulphone (e.g., ACUDEL brand modified polyphenylsulfone sold under product number 22000NT sold by Solvay Specialty Polymers).

Figure 12:
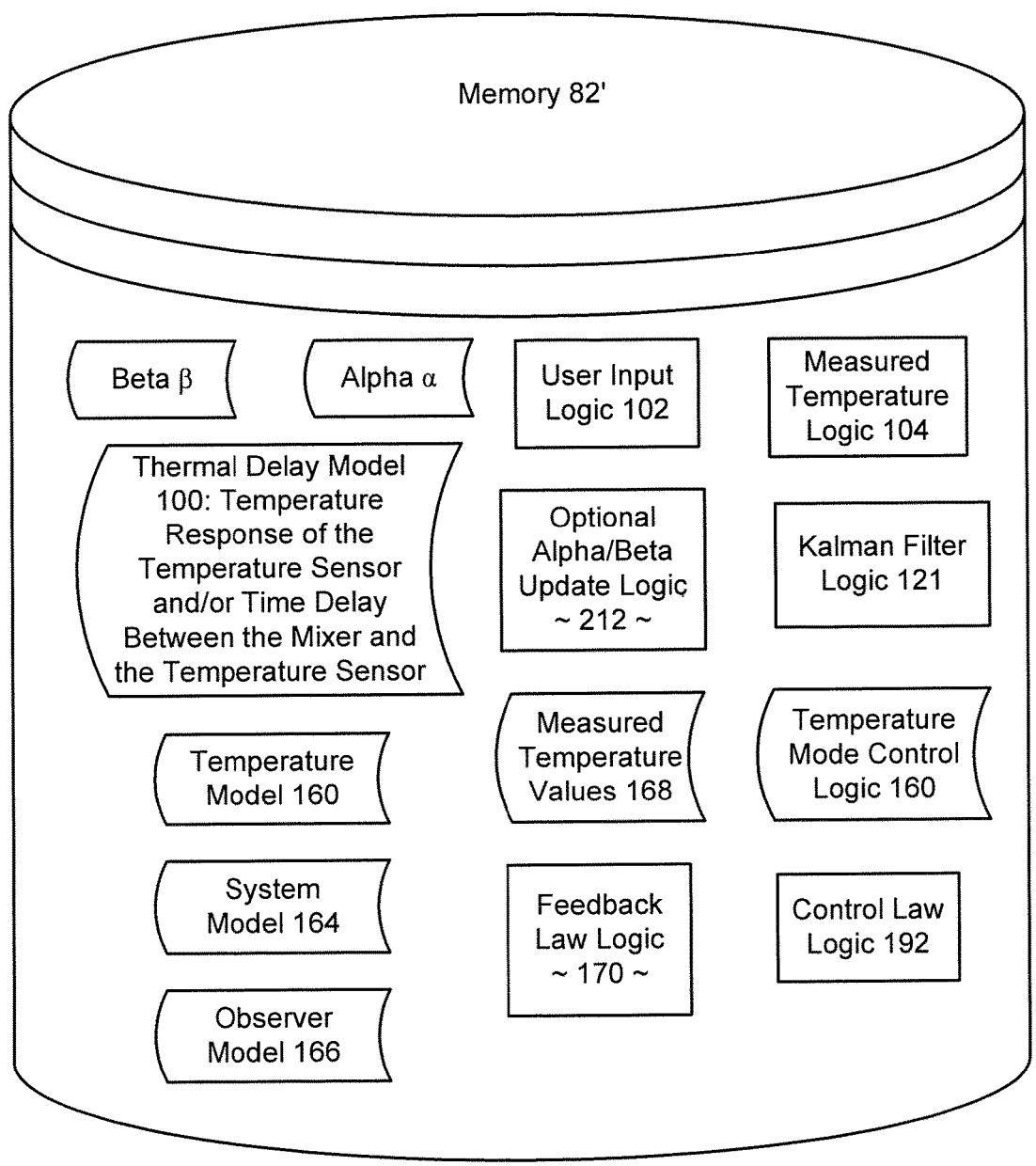
FIG. 12 is a schematic diagram of an exemplary non-transitory computer readable media of the electronic fluid control system of FIG. 7.

Referring back to FIG. 7, the Kalman filter 121 of exemplary implementation 120 has a number of different aspects, including the following (some of which are shown in FIG. 12): temperature model 160, temperature mode control logic 162, a system model 164, a observer model 166, measured temperature data 168 (input into the Kalman filter), and control effort u (input into the Kalman filter).

In the Kalman filter 121 of exemplary implementation 120, the temperature model 160 is a first order system, which is a relatively simple system model that is solved and computed as follows:

$$\dot{T} = \frac{1}{\tau}(T - T_f) \rightarrow T(t) = e^{-(t-t_0)/\tau}(T_0 - T_f) + T_f$$

where:
$T_0$ is the temperature at the time of the stimulus;
$T_f$ is the final temperature corresponding to this setup that is used for control (won't actually be attained);
t0 is time of the stimulus;
t is time as a variable; and
$\tau$ is the system time constant (related to the thermal response of the system);

This model is also relatively easy to discretize (two discretized forms are below):

$$T[n] = e^{-\left(\frac{n\Delta t - t_0}{\tau}\right)}(T_0 - T_f) + T_f \Leftrightarrow T[n+1] = T[n] + \alpha(T[n] - T[n-1])$$

where the term a (alpha) is directly related to the system time constant $\tau$ and both indicate the thermal response of the system 120; these are related to a number of aspects of the system 120, including the thermal mass of the system 120. Alpha α and the system time constant $\tau$ are related as follows:

$$\alpha = e^{-\frac{\Delta t}{\tau}}$$

Figure 11C:
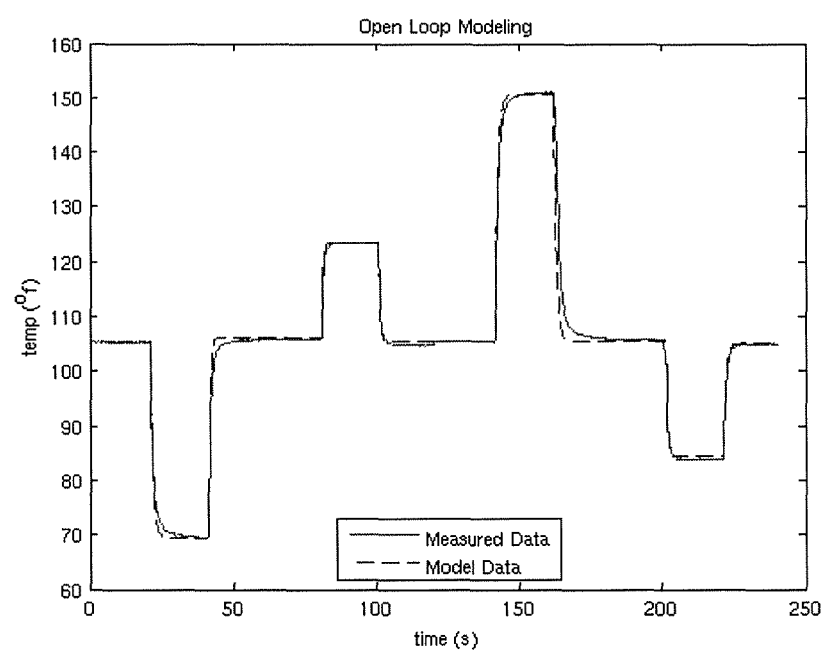

The value of alpha α (and the system time constant $\tau$) indicates a temperature response of at least a portion of the system. FIGS. 11A-B show exemplary plots of modeled temperature and measured temperature for two step changes in temperature showing that the temperature model 160 is relatively accurate. FIG. 11C shows that the model data closely corresponds to the measured data in circumstances of step changes up and down. An acceptable fitting criteria for the model is to have the largest open loop error less than 20 degrees and the steady state error less than 0.5 degrees, in Fahrenheit. In the exemplary implementation 120, alpha takes into account the temperature response of the temperature sensor 92. In exemplary systems 120, the model of the temperature response of the temperature sensor comprises a mathematical relation modeling the connection between step changes in the hot/cold mix condition (e.g., a step increase and/or a step decrease) and subsequent changes in the signal response of the temperature sensor, such as a step change in the hot/cold mass flow ratio.

The above equations do not yet include the control effort u (the signal applied to the system to move it closer to the desired output, i.e., closer to the desired measured temperature). Adding control effort u to the equation yields:

$$T[n+1]=T[n]+\alpha(T[n]-T[n-1])+\beta u[n+1]$$

where:
[n] is the current state;
[n+1] is the future state being predicted;
[n−1] is the immediate past state;
β is the innate control gain of the system; and
u is the control effort.

The temperature model control effort affects both the final temperature $T_f$ and results in a steady state final temperature $T_f$.

The terms α and β in the equations herein are used in the exemplary implementation 120 and will be different for systems of different configurations, e.g., different thermal masses, different thermal responses, etc. The terms α and β in exemplary implementation 120 are constants. The constants α and β can be determined empirically, e.g., by applying a step change in temperature to the system, measuring the change in temperature of the system with temperature sensor 92, and then repeatedly calculating the modeled response using different α and β values until α and β values closely matching the measured system response are determined, such as in FIGS. 11A-11B. An acceptable fitting criteria model is to have the largest open loop error less than 20 degrees and the steady state error less than 0.5 degrees, in Fahrenheit. In the alternative, the terms α and β can be determined using a linear regression solver, using with a sequence of measured data (x[n] and u[n]):

$$\begin{bmatrix} x[3]-x[2] \\ x[4]-x[3] \\ \vdots \\ x[N-1]-x[N-2] \\ x[N]-x[N-1] \end{bmatrix} = \begin{bmatrix} x[2]-x[1] & u[3] \\ x[3]-x[2] & u[4] \\ \vdots & \vdots \\ x[N-2]-x[N-3] & u[N-1] \\ x[N-1]-x[N-2] & u[N] \end{bmatrix} \begin{bmatrix} \alpha \\ \beta \end{bmatrix} \therefore \begin{bmatrix} \alpha \\ \beta \end{bmatrix} = $$

$$(\Phi^T\Phi)^{-1}\Phi^T Y,$$

where, $$\Phi = \begin{bmatrix} x[2]-x[1] & u[3] \\ x[3]-x[2] & u[4] \\ \vdots & \vdots \\ x[N-2]-x[N-3] & u[N-1] \\ x[N-1]-x[N-2] & u[N] \end{bmatrix},$$

N is the sequence length, and $$Y = \begin{bmatrix} x[3]-x[2] \\ x[4]-x[3] \\ \vdots \\ x[N-1]-x[N-2] \\ x[N]-x[N-1] \end{bmatrix}.$$

In either case, the alpha α and beta β values are predetermined and stored in memory. As shown in FIGS. 11A-11B, an alpha α value of about 0.9 works sufficiently well in some exemplary systems. A corresponding beta β value of about 7 works sufficiently well in those exemplary systems.

In the Kalman filter 121 of exemplary implementation 120, system state model 164 is based on update matrix A, control matrix B, and the control effort u:

$$x[n+1]=Ax[n]+Bu[n]$$

where:
[n] is the current state;
[n+1] is the future state being predicted;
[n−1] is the immediate past state;

$$A_n = A = \begin{bmatrix} 1+\alpha & -\alpha \\ 1 & 0 \end{bmatrix}$$

$$B_n = B = \begin{bmatrix} \beta \\ 0 \end{bmatrix}$$

$$x[n] = \begin{bmatrix} T[n] \\ T[n-1] \end{bmatrix}$$

In the Kalman filter 121 of exemplary implementation 120, the observation model 166 of actual system state is based on observer matrix C:

$$y[n]=Cx[n]$$

where:

$$C_n = C = \begin{bmatrix} 1 & 0 \\ 0 & 1 \end{bmatrix}$$

In the Kalman filter 121 of exemplary implementation 120, the current estimated temperature is:

$$\overline{T}_{\!E\!st}=A\overline{T}_{\!E\!st}[n]+Bu[n+1]$$

where u is the control effort, discussed below.

In the Kalman filter 121 of exemplary implementation 120, the covariance of the estimated temperature is based on the system covariance Σ and the control noise R:

$$\overline{\Sigma}=A\Sigma[n]A^T+R$$

where R can be declared as process covariance associated with the control effort and where:

$$\Sigma_n=(I-K_nC_n^T)\overline{\Sigma}_n$$

where K is the influence of the measured temperature on the final temperature estimate:

$$K_n=\overline{\Sigma}_nC_n^T(C_n\overline{\Sigma}_nC_n^T+Q_n)^{-1}$$

and where Q is the observer noise.

In the Kalman filter 121 of exemplary implementation 120, the system estimate u is:

$$\mu_n=\overline{\mu}_n+K_n(z_n-C_n\overline{\mu}_n)$$

where z in this context can be declared as observed temperature and where:

$$\bar{\mu}_n = A_n \mu_{n-1} + B_n u_n$$

and $$\mu_n = \begin{bmatrix} T[n] \\ T[n-1] \end{bmatrix}.$$

In the Kalman filter 121 of exemplary implementation 120, the temperature estimate of the thermistor and variance are:

$$\vec{T}_{\textbf{\textit{E}} Est}[n+1] = \vec{T}_{\textbf{\textit{E}} Est} + K(T_{obs}+[n+1] - C\vec{T}_{\textbf{\textit{E}} Est})$$

and $$\Sigma[n+1] = (I - KC)\Sigma.$$

The Kalman filter 121 is predictive in the sense that it calculates and uses a present state [n] of the system 120, and then the processor 81 looks back to a previous state at [n−1] for calculation of control effort u[n−1], which is used by the control logic to control the valve motors 84, 86. This is fundamentally different from other controllers, such as PID controllers.

In general, the Kalman filter 121 of exemplary implementation 120 combines the system state estimate with the observed temperature data in order to more accurately estimate the final output temperature. More specifically, Kalman filter 121 combines the measurement data with the state model data in order to obtain the best possible state estimation. Initially, the current estimated temperature and control effort are used to estimate a new (temporary) state estimate μ. This state estimate μ represents how the temperature should update if the model is perfect, and if the control effort u (below) is perfect. Since the model and the control effort u are not perfect, the covariance Σ of the estimated temperature is computed. The covariance Σ of the current temperature estimate is used along with R, the covariance associated with the control effort u, to generate a new (also temporary) covariance matrix. Covariance matrices by definition are symmetric positive semi-definite. If at any point the matrices are no longer positive semi-definite, then an algebraic error was made. If no measured data is available, then both the mean and variance of the new temperature are estimated already. The next step is to compute the influence of the measured temperature value on the final temperature estimate.

The variable Q represents the variance associated with the sensing device (i.e., thermistor). This is similar to the covariance Σ of the state update model. The result is the Kalman gain. It represents how much the measured data is 'trusted' relative to the estimated state. Kalman gain value of 0 indicates that only the state estimated temperature is used. Kalman gain value of 1 indicates that only the measured temperature is used. Both of the states for Kalman gains, 0 and 1, are cases where information is lost. This is because the sensed data or the estimated data are ignored by the filter. The final step of the Kalman filter is to compute the temperature estimate of the thermistor and variance respectively.

Figure 13A:
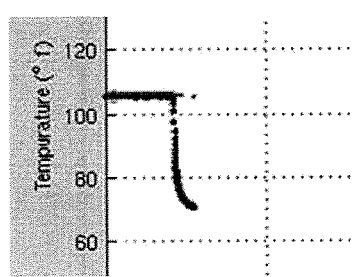
FIGS. 13A-13E are data plots showing dynamically how the modeled temperature tracks the measured temperature in the electronic fluid control system of FIG. 7 in response to a significant step down in pressure of hot water.
Figure 13B:
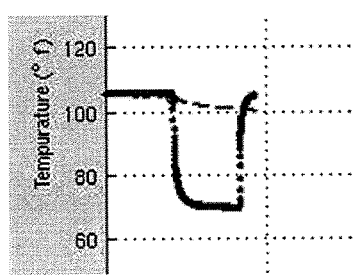
Figure 13C:
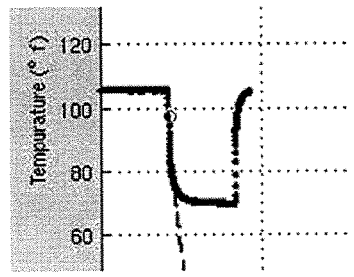
Figure 13D:
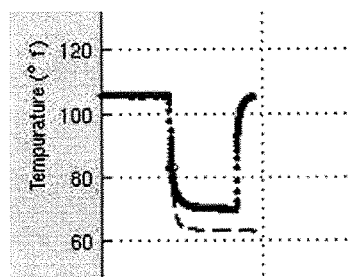
Figure 13E:
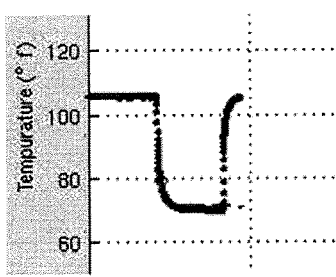
Figures 14A, 14B, 14C:
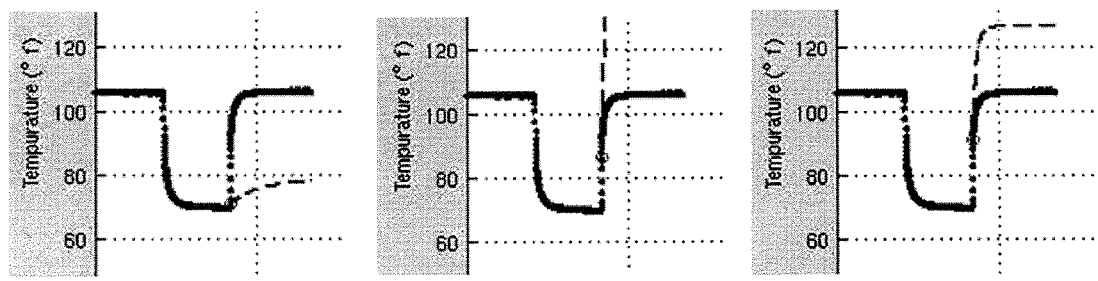
FIGS. 14A-14C are data plots showing dynamically how the modeled temperature tracks the measured temperature in the electronic fluid control system of FIG. 7 in response to a significant step up in pressure of hot water.

Referring now to FIGS. 13A-13E and 14A-14C, these figures show exemplary data plots showing dynamically how the modeled temperature, i.e., the estimated future temperature calculated by the Kalman filter for control purposes, tracks the measured temperature (at the temperature sensor) in the electronic fluid control system of FIG. 7 in response to a significant step down in pressure of hot water or a significant step up in pressure of hot water, respectively. In this exemplary embodiment, the Kalman filter is looking at three of the measured data points and calculating an estimated future temperature, as discussed herein. As shown in the key for these figures, the current time is indicated by a small circle (an arrow points to the circle in each). In FIG. 13A, there are only minor (if any) fluctuations in measured temperature the estimated future temperature calculated by the Kalman filter closely corresponds to the measured temperature points. In FIG. 13B, one data point into the measured step change down in temperature, the estimated future temperature calculated by the Kalman filter begins to move. In FIG. 13C, several data points into the measured step change down in temperature, the estimated future temperature calculated by the Kalman filter is very low (the Kalman filter sees only the steep downward slope of the few measured data points). In FIG. 13D, as the measured data points initially begin turning, the estimated future temperature calculated by the Kalman filter becomes more and more like the future measured data points and eventually becomes nearly identical thereto again (FIG. 13E). FIGS. 14A-14C show how the Kalman responds in a similar fashion to a step increase in temperature. In FIG. 14A, one data point into the measured step increase in temperature, the estimated future temperature calculated by the Kalman filter begins to move upward. In FIG. 14B, several data points into the measured step increase in temperature, the estimated future temperature calculated by the Kalman filter is very high (the Kalman filter sees only the steep upward slope of the few measured data points). In FIG. 14C, as the measured data points initially begin turning, the estimated future temperature calculated by the Kalman filter becomes more and more like the future measured data points.

Referring back to FIG. 7, looking at the bottom of FIG. 7, the feedback law 170 calculates a control effort u. More specifically, after the Kalman filter executes once (when one cycle of the Kalman filter is used for each measured data point) or when the Kalman filter settles after multiple iterations (if the Kalman filter iterates two or more times for each new measured data point and stops, e.g., when a variance reaches a threshold), the feedback law 170 of the exemplary implementation 120 calculates the control effort u as follows:

$$u[n+1] = d[n]\frac{1-\alpha}{\beta} + \Delta d[n]\frac{\alpha}{\beta}$$

where:
 [n] is the current state;
 [n+1] is the future state being predicted;
 $d[n] = T_{desired}[n] - T[n]$, and
 $\Delta d[n] = T[n-1] - T[n]$.
Similarly, the control effort can be calculated as follows:

$$u_n = \frac{T_{des}[n+1] - (1+\alpha)T[n] + \alpha T[n-1]}{\beta}.$$

where:
 [n] is the current state;
 [n+1] is the future state being predicted; and
 [n−1] is the immediate past state.

Thus, the processor 81 in the exemplary implementation 120 uses the estimate of α and β to generate the next control effort u[n+1]; the actual control effort u[n] applied can be tweaked, e.g., capped at a particular value, to reduce overshoot, if needed.

Referring back to FIG. 7, the control effort u is applied to the physical plant 190 via control law 192. The physical plant 190 represents the actual system (e.g., the valves 84, 86, the motors M1, M2, the mixer 90, the temperature sensor 92, and all piping and corresponding support structure, etc.). In the exemplary implementation 120, control law logic 192 converts the calculated control effort u into signals that drive the motors to open and close the hot and cold valves.

In the context of FIG. 9, the control effort u is translated by the control law 192 into the hot and cold control signals 85, 88 by the processor 81 converting u to a number of stepper motor steps for motors M1, M2 to move the needles (or other flow control members) in valves 84, 86 a corresponding amount to open or close the valves consistent with the control effort u. The control law logic 192 moves the stepper motors in proportion to the magnitude of the control effort u. For example, a relatively high positive control effort u will be converted by the control law 192 into signals 85, 88 that cause motor M1 to close cold valve 84 as much as possible and cause motor M2 to open hot valve 86 as much as possible. In contrast, a relatively high negative control effort u will be converted by the control law 192 into signals 85, 88 that cause motor M1 to open cold valve 84 as much as possible and cause motor M2 to close hot valve 86 as much as possible. In exemplary implementation 120, control law 192 is a process in which the processor 81 is called every twenty milliseconds to see if the motors M1, M2 need to be further adjusted that cycle. Advantageously, in the exemplary implementation 120, the control law 192 is simplified by controlling the valves 84, 86 in a see-saw manner so that the resulting flow is substantially constant proximate the control point, which reduces the degree of freedom to gain stability, e.g., as the Hot valve 86 is closed an amount X (e.g., closed by five stepper motor steps), the Cold valve 84 is opened by the same amount X (e.g., opened by the same five stepper motor steps), and vice versa. In response to changes in the positions of valves 84, 86, the temperature T(t) of system 120 changes. Such changes are sensed by temperature sensor 92 and taken into account by the Kalman filter 121 via the equations above. When initially opening the valves on startup, there are several different ways to begin, e.g., opening cold first or opening both cold and hot together. In the exemplary implementation 120, cold is opened first while keeping the hot closed. Then, if the measured temperature is lower than the set point, hot is opened while cold is reduced. This is a safety measure to prevent an accidental, initial slug of hot water from being dispensed.

As discussed above, changes in pressure/flow of the hot and cold supplies will affect the temperature T(t) of system 120. Significant changes in pressure/flow rate of incoming hot water typically occur when a dishwasher or washing machine turns on and significant changes in pressure/flow rate of incoming cold water typically occur when a local toilet is flushed. Because it is predictive in nature, the predictive Kalman filter 121 of the exemplary implementation 120 automatically responds very quickly to compensate for such changes in supply pressure, even at low flow rates downstream of the mixer, e.g., even at 2.0 gpm flow, or 1.75 gpm flow, or 1.5 gpm flow, or even 1.25 gpm flow downstream of mixer 90. The predictive Kalman filter 121 of the exemplary implementation 120 also automatically responds very quickly to compensate for even very large changes in supply pressure. More specifically, although ASSE 1016 contemplates hot and/or cold water supply pressures increased or decreased by 20%, exemplary implementation 120 can maintain target temperature even with a change in one supply of ±30% or ±40% or even ±50%. For example, exemplary implementation 120 can maintain a target temperature of 100 degrees F. even with one supply (e.g., the Hot supply) at 45 psi and the other supply (the Cold supply) instantly dropping from 45 psi to 22 psi (at a flow rate downstream of the mixer 90 of 2 gpm). Exemplary implementation 120 is accomplished without any sensors in addition to temperature sensor 92, such as flow sensors on the Hot and/or the Cold supplies or temperature sensors measuring the temperature of the water supplied by the Hot and/or the Cold supplies. Of course, such sensors could be added to the physical plant 190, and added to the above equations.

In the exemplary implementation 120, the Kalman filter 121 executes about every 20 milliseconds (~50 Hz). Surprisingly, it was discovered that in exemplary implementation 120, there was an upper limit at which the Kalman filter 121 could function optimally, even with unlimited processing power (i.e., the upper limit was not caused by an inability for the Kalman routine to finish executing). For example, although not exhaustively tested, it is believed that Kalman filter 121 in exemplary implementation 120 will execute stably at 10-100 Hz, but would become less stable and potentially unstable if executed at 200 Hz or faster, i.e., the Kalman filter cannot find the control point, even with unlimited processing power. Although not wanting to be bound by theory, it is hypothesized that shower physical plants generally have a certain thermal mass and the suitable range of execution rates for the Kalman filter 121 is related to that thermal mass.

To help explain the Kalman filter 121 of exemplary implementation 120, two examples are presented below: (a) where the shower is first turned on and the Kalman filter is seeking a control point and (b) where the shower is carefully controlling to the desired temperature with relatively constant supply pressure (both at 45 psi) and the Cold supply instantly starts dropping from 45 psi to 22 psi (a fast, exponential decay in flow rate), as might be experienced when a local toilet is flushed.

In the first example, where the shower is first turned on and a target temperature is selected, both the Hot and Cold supplies will initially be supplying relatively cold water (before the Hot supply begins delivering heated water), e.g., about 50 degrees F. (tap water from the northern states compared to the southern states can vary by as much as 6 to 10 degrees in the US). Initially, cold is opened first while keeping the hot closed. Consequently, the measured temperature 94 will be much lower than the desired temperature. Accordingly, inside the Kalman filter 121, Kalman out will be a large amount of positive control effort in order to increase the temperature. This repeats every 20 ms. In response, the control law 192 will calculate a maximum possible positive control effort u, which will cause the processor 81 to close the cold valve 84 as much as possible and open the hot valve 86 as much as possible until the temperature starts to rise as the cold water between the hot water tank (not shown) and the system 120 purges out of the system 120. As the measured temperature 94 starts to rise, inside the Kalman filter 121, the difference between the desired temperature and the future estimates of the temperature will become smaller. In response, the control law 192 will calculate sequentially smaller positive control effort u values, which will cause the processor 81 to begin opening the cold valve 84 and closing the hot valve 86. Eventually, the measured temperature 94 will be at the desired temperature. When this state is achieved, inside the Kalman filter 121, the effort of Kalman filter becomes minimizing the steady state error of the temperature around the desired temperature. In response, the control law 192 will calculate zero or very small control effort u values, which will cause the processor 81 to either leave the valves 84, 86 in their current positions or make small adjustments to their positions in a see-saw fashion.

In the second example, the measured temperature 94 is right at about at the desired temperature and the control law 192 is calculating zero or very small control effort u values, which is causing the processor 81 to either leave the valves 84, 86 in their current positions or make small adjustments to their positions. Suddenly, a local toilet is flushed and the Cold supply pressure instantly starts dropping from 45 psi to 22 psi (it will be a fast, exponential decay in flow rate). Consequently, the measured temperature 94 of the shower water will begin quickly rising, e.g. Accordingly, inside the Kalman filter 121, a large amount of error between the desired temperature and the measured temperature, and a large negative counter control effort is issued to minimize the temperature error. This repeats every 20 ms until the goal is achieved. In response, the control law 192 will calculate a maximum possible negative control effort u, which will cause the processor 81 to close the hot valve 86 as much as possible and open the cold valve 84 as much as possible (the valves 84, 86 are still controlled in a see-saw fashion) until the temperature starts to rise. As the measured temperature 94 starts to drop, inside the Kalman filter 121, the decrease in temperature is continuously predicted and the control effort is gradually reduced. In response, the control law 192 will calculate sequentially smaller negative control effort u values, which will cause the processor 81 to begin closing the cold valve 84 and opening the hot valve 86. Eventually, the measured temperature 94 will be at the desired temperature. When this state is achieved, inside the Kalman filter 121, the effort of Kalman filter becomes minimizing the steady state error of the temperature around the desired temperature. In response, the control law 192 will calculate zero or very small control effort u values, which will cause the processor 81 to either leave the valves 84, 86 in their current positions or make small adjustments to their positions in a see-saw fashion.

Figure 15:
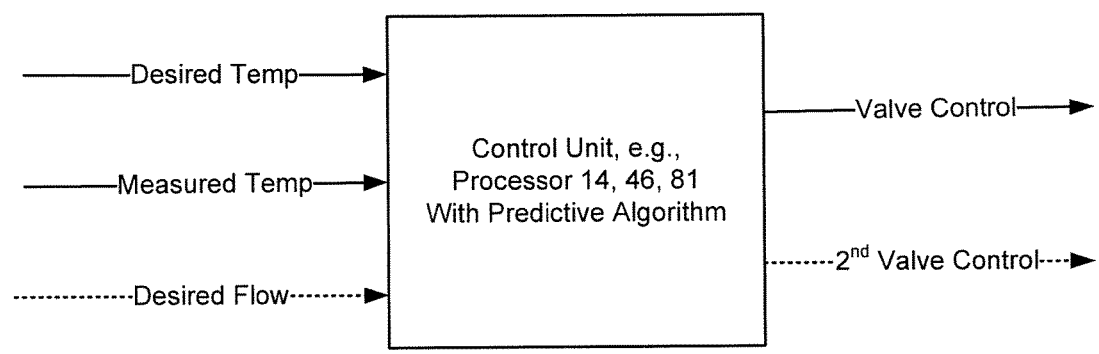
FIG. 15 is a schematic flow diagram showing various inputs and outputs for exemplary controllers for the electronic fluid control systems of FIGS. 1, 3, 5, 7.

Referring now to FIG. 15, various inputs and outputs for the various control units for FIGS. 1, 3, 5, and 7-14 are shown. As shown in FIG. 15, all of the control units, e.g., processors 14, 46, 81, etc. accept as inputs a desired temperature and a measured temperature and, optionally, a desired flow (e.g., a certain percent of the maximum flow). The desired temperature and the optional desired flow can be entered by a user, e.g., using user interface 83. As shown in FIG. 15, all of the control units, e.g., processors 14, 46, 81, etc. generate at least one valve control signal to control at least one valve and perhaps a second valve control signal (to control a second valve). In other embodiments not shown, an additional flow sensor may also be used to better determine flow rate.

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, although many of the embodiments above are presented in the context of a shower, the teachings herein apply equally well to faucet controllers providing a stream of water into a sink. As another example, the predicative algorithms in the various methods can be any of the various predictive algorithms herein, such as a Kalman filter or some other predictive algorithm. As still another example, some exemplary systems will have a plurality of operational modes and during each operational mode the flow output by the valve is substantially constant for that mode, the operational modes including at least a relatively higher flow mode (e.g., to quickly fill a tub) and a relatively lower flow mode (e.g., for a shower in a geographic region with shower flow restrictions). As yet another example, in exemplary embodiments, a user input or installer input 83 is provided to cause the system to determine the approximate temperature of hot water directly from the Hot supply (some homes have a hot water tank set at about 120 degrees F. and some homes have a hot water tank set at about 150 degrees F.) and use that in the temperature control algorithms herein. As still another embodiment, the valve(s) and mixer can be implemented with a one-input, 2-input, or N-input mixing valve controlled in accordance with the teachings herein, i.e., controlling the valve(s) in the mixing valve to provide a temperature controlled stream of fluid via a shower controller or faucet controller under challenging, low-flow conditions. As yet still another example, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

Exemplary Embodiments

1. An electronic fluid control system, comprising:
   an electronically controlled valve; and
   at least one processor programmed to control the electronically controlled valve to control a temperature of a fluid downstream of the valve using at least a predictive algorithm.

2. An electronic fluid control system, comprising:
   an electronically controlled valve;
   a temperature sensor associated with the valve; and
   at least one processor programmed to control the valve to control a temperature of a fluid downstream of the valve using at least a predictive algorithm including at least data from the temperature sensor and a model of a temperature response of at least a portion of the system.

3. An electronic fluid control system, comprising:
   at least one processor having associated memory;
   at least one valve having at least a hot fluid input, a cold fluid input, a hot fluid output, and a cold fluid output, the at least one valve controlling (a) a flow of hot fluid between the hot fluid input and output and (b) a flow of cold fluid between the cold fluid input and output in response to one or more signals from the processor;
   a mixing chamber downstream of the at least one valve for mixing the flows of hot and cold fluids output by the valve;

a temperature sensor downstream of the at least one valve and generating a real time temperature signal indicating a temperature of a fluid downstream of the mixing chamber; and a user input device that receives user input and communicates to the at least one processor user data corresponding to the user input, the user data including at least a desired temperature input; and the memory having stored thereon at least a model of a temperature response of at least a portion of the system;

the memory having further stored thereon code causing the at least one processor to:
  receive an entered desired temperature input via the user input device;
  receive measured temperature data corresponding to the real time temperature signal; and
  control the valve to control a temperature of the fluid downstream of the mixing chamber toward the desired temperature input using a predictive algorithm acting on at least (i) the model of a temperature response of at least a portion of the system, (ii) the desired temperature, and (iii) the measured temperature data.

4. The electronic fluid control system according to embodiment 2 or embodiment 3, wherein the model of a temperature response of at least a portion of the system comprises at least a model of the temperature response of the temperature sensor.

5. The electronic fluid control system according to embodiment 4, wherein the model of the temperature response of the temperature sensor comprises a non-mathematical model of the connection between changes in the temperature of the fluid and subsequent changes in the signal response of the temperature sensor.

6. The electronic fluid control system according to embodiment 4, wherein the model of the temperature response of the temperature sensor comprises a non-mathematical model of the connection between step changes in the temperature of the fluid and subsequent changes in the signal response of the temperature sensor.

7. The electronic fluid control system according to embodiment 4, wherein the model of the temperature response of the temperature sensor comprises a mathematical relation modeling the connection between changes in the temperature of the fluid and subsequent changes in the signal response of the temperature sensor.

8. The electronic fluid control system according to embodiment 4, wherein the model of the temperature response of the temperature sensor comprises a mathematical relation modeling the connection between step changes in the temperature of the fluid and subsequent changes in the signal response of the temperature sensor.

9. The electronic fluid control system according to any one of the foregoing embodiments, wherein the predictive algorithm is configured to determine a predicted future state of the electronic fluid control system and wherein the processor generates at least one control signal for a state earlier in time than the predicted future state using the predicted future state of the electronic fluid control system.

10. The electronic fluid control system according to any one of the foregoing embodiments, wherein the predictive algorithm comprises a Kalman filter configured to determine a predicted future state of the electronic fluid control system and wherein the processor generates at least one control signal for a state earlier in time than the predicted future state using the predicted future state of the electronic fluid control system.

11. A method, comprising:
  providing an electronically controlled valve; and
  controlling the valve to control a temperature of a mixed fluid downstream of the valve using a processor programmed with a predictive algorithm.

12. A method, comprising:
  providing an electronically controlled valve; and
  controlling the valve to control a temperature of a mixed fluid downstream of the valve using a processor programmed with a Kalman filter configured as a predictive algorithm.

13. A method, comprising:
  providing an electronically controlled valve;
  receiving measured temperature data associated with the valve; and
  controlling the valve to control a temperature of a mixed fluid downstream of the valve using a processor programmed with a Kalman filter configured as a predictive algorithm and the Kalman filter utilizing at least (a) a model of a temperature response of at least a portion of the system and (b) measured temperature data.

What is claimed is:

1. An electronic water control system, comprising:
  an electronically controlled valve; and
  at least one processor programmed to control the electronically controlled valve to control a temperature of water downstream of the valve using at least a predictive algorithm, and
  a temperature sensor associated with the valve; and
  wherein the at least one processor is programmed to control the valve to control a temperature of water downstream of the valve using at least a predictive algorithm including at least data from the temperature sensor and a model of a temperature response of at least a portion of the system; and
  wherein the predictive algorithm is configured to determine a predicted future state of the electronic water control system and wherein the processor generates at least one control signal for a state earlier in time than the predicted future state using the predicted future state of the electronic water control system.

2. The electronic water control system according to claim 1, wherein the model of a temperature response of at least a portion of the system comprises at least a model of the temperature response of the temperature sensor.

3. The electronic water control system according to claim 2, wherein the model of the temperature response of the temperature sensor comprises a non-mathematical model of the connection between changes in the temperature of the water and subsequent changes in the signal response of the temperature sensor.

4. The electronic water control system according to claim 2, wherein the model of the temperature response of the temperature sensor comprises a non-mathematical model of the connection between step changes in the temperature of the water and subsequent changes in the signal response of the temperature sensor.

5. The electronic water control system according to claim 2, wherein the model of the temperature response of the temperature sensor comprises a mathematical relation modeling the connection between changes in the temperature of the water and subsequent changes in the signal response of the temperature sensor.

6. The electronic water control system according to claim 2, wherein the model of the temperature response of the temperature sensor comprises a mathematical relation modeling the connection between step changes in the temperature of the water and subsequent changes in the signal response of the temperature sensor.

7. The electronic control system according to claim 2, wherein the predictive algorithm is configured to determine a predicted future state of the electronic water control system using at least the model of the temperature response of the temperature sensor and wherein the processor generates at least one control signal for a state earlier in time than the predicted future state using the predicted future state of the electronic water control system.

8. The electronic water control system according to claim 2, wherein the predictive algorithm comprises a Kalman filter configured to determine a predicted future state of the electronic water control system and wherein the processor generates at least one control signal for a state earlier in time than the predicted future state using the predicted future state of the electronic water control system.

9. The electronic water control system according to claim 1, wherein the predictive algorithm comprises a Kalman filter configured to determine a predicted future state of the electronic water control system and wherein the processor generates at least one control signal for a state earlier in time than the predicted future state using the predicted future state of the electronic water control system.

10. The electronic water control system according to claim 1, wherein the valve is controlled by the at least one processor using measured data only from a single temperature sensor.

11. The electronic water control system according to claim 10, wherein the valve controlled by the at least one processor maintains target temperature with a change in one supply in the range of 30% to 50% under ASSE 1016.

12. The electronic water control system according to claim 10, wherein the valve controlled by the at least one processor maintains target temperature with a change in one supply in the range of 40% to 50% under ASSE 1016.

13. The electronic water control system according to claim 10, wherein the valve controlled by the at least one processor maintains a target temperature of 100 degrees F. even with a hot water input at 45 psi and a cold water input instantly dropping from 45 psi to 22 psi at a flow rate of 2 gpm downstream of a hot/cold mixer.

14. The electronic water control system according to claim 1, wherein the valve controlled by the at least one processor maintains target temperature with a change in one supply in the range of 30% to 50% under ASSE 1016.

15. The electronic water control system according to claim 1, wherein the valve controlled by the at least one processor maintains target temperature with a change in one supply in the range of 40% to 50% under ASSE 1016.

16. The electronic water control system according to claim 1, wherein the valve controlled by the at least one processor maintains a target temperature of 100 degrees F. even with a hot water input at 45 psi and a cold water input instantly dropping from 45 psi to 22 psi at a flow rate of 2 gpm downstream of a hot/cold mixer.

17. An electronic water control system, comprising:
at least one processor having associated memory;
at least one valve having at least a hot water input, a cold water input, a hot water output, and a cold water output, the at least one valve controlling (a) a flow of hot water between the hot water input and output and (b) a flow of cold water between the cold water input and output in response to one or more signals from the processor;
a mixing chamber downstream of the at least one valve for mixing the flows of hot and cold fluids output by the valve;
a temperature sensor downstream of the at least one valve and generating a real time temperature signal indicating a temperature of water downstream of the mixing chamber; and
a user input device that receives user input and communicates to the at least one processor user data corresponding to the user input, the user data including at least a desired temperature input; and
the memory having stored thereon at least a model of a temperature response of at least a portion of the system;
the memory having further stored thereon code causing the at least one processor to:
receive an entered desired temperature input via the user input device;
receive measured temperature data corresponding to the real time temperature signal; and
control the valve to control a temperature of the water downstream of the mixing chamber toward the desired temperature input using a predictive algorithm acting on at least (i) the model of a temperature response of at least a portion of the system, (ii) the desired temperature, and (iii) the measured temperature data; and
wherein the predictive algorithm is configured to determine a predicted future state of the electronic water control system and wherein the processor generates at least one control signal for a state earlier in time than the predicted future state using the predicted future state of the electronic water control system.

18. The electronic water control system according to claim 17, wherein the model of a temperature response of at least a portion of the system comprises at least a model of the temperature response of the temperature sensor.

19. The electronic water control system according to claim 18, wherein the model of the temperature response of the temperature sensor comprises a non-mathematical model of the connection between changes in the temperature of the water and subsequent changes in the signal response of the temperature sensor.

20. The electronic water control system according to claim 18, wherein the model of the temperature response of the temperature sensor comprises a non-mathematical model of the connection between step changes in the temperature of the water and subsequent changes in the signal response of the temperature sensor.

21. The electronic water control system according to claim 18, wherein the model of the temperature response of the temperature sensor comprises a mathematical relation modeling the connection between changes in the temperature of the water and subsequent changes in the signal response of the temperature sensor.

22. The electronic water control system according to claim 18, wherein the model of the temperature response of the temperature sensor comprises a mathematical relation modeling the connection between step changes in the temperature of the water and subsequent changes in the signal response of the temperature sensor.

23. The electronic water control system according to claim 17 wherein the predictive algorithm comprises a Kalman filter configured to determine a predicted future state of the electronic water control system and wherein the processor generates at least one control signal for a state earlier in time than the predicted future state using the predicted future state of the electronic water control system.

24. The electronic water control system according to claim 17, wherein the valve is controlled by the at least one processor using measured data only from a single temperature sensor.

25. The electronic water control system according to claim 24, wherein the valve controlled by the at least one processor maintains target temperature with a change in one supply in the range of 30% to 50% under ASSE 1016.

26. The electronic water control system according to claim 24, wherein the valve controlled by the at least one processor maintains target temperature with a change in one supply in the range of 40% to 50% under ASSE 1016.

27. The electronic water control system according to claim 24, wherein the valve controlled by the at least one processor maintains a target temperature of 100 degrees F. even with the hot water input at 45 psi and the cold water input instantly dropping from 45 psi to 22 psi at a flow rate of 2 gpm downstream of a hot/cold mixer.

28. The electronic water control system according to claim 17, wherein the valve controlled by the at least one processor maintains target temperature with a change in one supply in the range of 30% to 50% under ASSE 1016.

29. The electronic water control system according to claim 17, wherein the valve controlled by the at least one processor maintains target temperature with a change in one supply in the range of 40% to 50% under ASSE 1016.

30. The electronic water control system according to claim 17, wherein the valve controlled by the at least one processor maintains a target temperature of 100 degrees F. even with the hot water input at 45 psi and the cold water input instantly dropping from 45 psi to 22 psi at a flow rate of 2 gpm downstream of a hot/cold mixer.

31. A method, comprising:
providing an electronically controlled valve;
receiving measured temperature data associated with the valve; and
controlling the valve to control a temperature of a mixed water downstream of the valve using a processor programmed with a Kalman filter configured as a predictive algorithm and the Kalman filter utilizing at least (a) a model of a temperature response of at least a portion of the system and (b) measured temperature data; and
wherein the Kalman Filter is configured to determine a predicted future state of the electronic water control system and wherein the processor generates at least one control signal for a state earlier in time than the predicted future state using the predicted future state of the electronic water control system.

32. The method according to claim 31, wherein the valve is controlled using measured data only from a single temperature sensor.

33. The method according to claim 32, wherein the valve controlled by the at least one processor maintains target temperature with a change in one supply in the range of 30% to 50% under ASSE 1016.

34. The method according to claim 32, wherein the valve controlled by the at least one processor maintains target temperature with a change in one supply in the range of 40% to 50% under ASSE 1016.

35. The method according to claim 32, wherein the valve controlled by the at least one processor maintains a target temperature of 100 degrees F. even with a hot water input at 45 psi and a cold water input instantly dropping from 45 psi to 22 psi at a flow rate of 2 gpm downstream of a hot/cold mixer.

36. The method according to claim 31, wherein the valve controlled by the at least one processor maintains target temperature with a change in one supply in the range of 30% to 50% under ASSE 1016.

37. The method according to claim 31, wherein the valve controlled by the at least one processor maintains target temperature with a change in one supply in the range of 40% to 50% under ASSE 1016.

38. The method according to claim 31, wherein the valve controlled by the at least one processor maintains a target temperature of 100 degrees F. even with a hot water input at 45 psi and a cold water input instantly dropping from 45 psi to 22 psi at a flow rate of 2 gpm downstream of a hot/cold mixer.

* * * * *